(12) United States Patent
Moon et al.

(10) Patent No.: US 11,949,246 B2
(45) Date of Patent: Apr. 2, 2024

(54) WIRELESS POWER TRANSMISSION APPARATUS AND METHOD OF OPERATING THE SAME

(71) Applicant: LG Electronics Inc., Seoul (KR)

(72) Inventors: Hyunwook Moon, Seoul (KR); Euisung Kim, Seoul (KR); Jaewoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/139,806

(22) Filed: Apr. 26, 2023

(65) Prior Publication Data

US 2023/0261524 A1    Aug. 17, 2023

Related U.S. Application Data

(63) Continuation of application No. 17/178,775, filed on Feb. 18, 2021, now Pat. No. 11,658,515.

(30) Foreign Application Priority Data

Feb. 18, 2020   (KR) .................. 10-2020-0019887

(51) Int. Cl.
   *H02J 50/12*   (2016.01)
   *H02J 50/80*   (2016.01)
   *H02J 50/60*   (2016.01)

(52) U.S. Cl.
   CPC .............. *H02J 50/12* (2016.02); *H02J 50/80* (2016.02); *H02J 50/60* (2016.02)

(58) Field of Classification Search
   CPC ............. H02J 50/12; H02J 50/80; H02J 50/60

USPC ......................................................... 307/104
   See application file for complete search history.

(56) References Cited

U.S. PATENT DOCUMENTS

| | | | |
|---|---|---|---|
| 2016/0359375 A1* | 12/2016 | Lee | ..................... H02J 7/00714 |
| 2018/0212470 A1 | 7/2018 | Leem | |
| 2018/0294681 A1* | 10/2018 | Bae | ......................... H02J 50/70 |
| 2019/0020225 A1* | 1/2019 | Kwon | ..................... H02J 50/80 |

(Continued)

FOREIGN PATENT DOCUMENTS

| | | |
|---|---|---|
| CN | 104124996 | 8/2018 |
| EP | 3319206 | 5/2018 |

(Continued)

OTHER PUBLICATIONS

Extended European Search Report in European Appln. No. 21157886.9, dated Jun. 23, 2021, 9 pages.

*Primary Examiner* — Alfonso Perez Borroto
(74) *Attorney, Agent, or Firm* — Fish & Richardson P.C.

(57) ABSTRACT

A wireless power transmission apparatus includes: a transmission coil configured to transmit power to a wireless power reception apparatus, an inverter that includes a plurality of switching elements and that is configured to output a current of a predetermined frequency to the transmission coil through an operation of the plurality of switching elements, and a controller. The controller can be configured to calculate an output level of power transmitted through the transmission coil, determine a load state of the wireless power reception apparatus based on a target level of power transmitted through the transmission coil and the calculated output level, and control the inverter based on the determined load state of the wireless power reception apparatus.

20 Claims, 13 Drawing Sheets

(56) References Cited

U.S. PATENT DOCUMENTS

| | | |
|---|---|---|
| 2019/0140469 A1 | 5/2019 | Lee |
| 2019/0148987 A1 | 5/2019 | Jung |
| 2019/0235041 A1 | 8/2019 | Lee |
| 2019/0296591 A1* | 9/2019 | Park .................. H02J 50/80 |
| 2020/0153283 A1 | 5/2020 | Kanakasabai et al. |

FOREIGN PATENT DOCUMENTS

| | | |
|---|---|---|
| EP | 3582466 | 12/2019 |
| EP | 3605780 | 2/2020 |
| WO | WO2019080198 | 5/2019 |

* cited by examiner

WIRELESS POWER TRANSMISSION APPARATUS AND METHOD OF OPERATING THE SAME

CROSS-REFERENCE TO RELATED APPLICATION

The present disclosure is a continuation of U.S. application Ser. No. 17/178,775, filed on Feb. 18, 2021, which claims priority to and the benefit of Korean Patent Application No. 10-2020-0019887, filed on Feb. 18, 2020, in the Korean Intellectual Property Office, the disclosures of which are incorporated herein by reference in their entirety.

TECHNICAL FIELD

The present disclosure relates to a wireless power transmission apparatus and a method of operating the same, and more particularly, to a wireless power transmission apparatus for determining a load state of a wireless power reception apparatus and a method of operating the same.

BACKGROUND

In general, when supplying power to an electronic device, a terminal supply method of supplying commercial power by connecting a physical cable or a wire to the electronic device is used. In such a terminal supply method, cables or wires occupy a considerable space where arranging such cables or wires introduces difficult tasks, and there is a risk of disconnection. Nowadays, in order to solve such problems, research on a wireless power supply method has been discussed.

A wireless power supply system may be configured with a wireless power transmission apparatus for supplying power through a single coil or multiple coils, and a wireless power reception apparatus for receiving and using power wirelessly supplied from the wireless power transmission apparatus.

As the wireless power supply method, an inductive coupling method is mainly used, and this method uses a principle in which when an alternating current with a varying current intensity flows through a primary coil among two adjacent coils, a magnetic field changes due to an alternating current flowing through the primary coil, and thus a magnetic flux passing through a secondary coil changes, and an induced electromotive force is generated at the secondary coil side. That is, according to this method, when only the current flowing through the primary coil is changed with the two coils separated, an induced electromotive force is generated at the secondary coil side.

Various small cooking appliances such as blenders and mini ovens commonly used in kitchens also require power supply as in other electronic devices, and the demand for small-sized cooking appliances to which a wireless power supply method is applied is also rapidly increasing for reasons such as space utilization and safety.

In the conventional wireless power supply method, a wireless power transmission apparatus controls a level of output power based on a change in power supplied thereto or data received from a wireless power reception apparatus. For example, a conventional wireless power transmission apparatus monitors the magnitude of an input current, and limits a level of output power when a change of the current magnitude is greater than a predetermined level or limits a level of output power according to a power control message received from the wireless power reception apparatus.

In general, the conventional wireless power supply method is used for charging a battery of the wireless power reception apparatus, and in this case, it is extremely rare that a load state of the wireless power reception apparatus changes rapidly. Thus it is sufficient for the wireless power transmission apparatus to adjust a level of output power based on the change of power supplied to the wireless power transmission apparatus or a power control message received from the wireless power reception apparatus.

However, in the case of small cooking appliances operating by supplied power, a case in which a load state rapidly changes compared to battery charging may occur frequently. For example, in the case of a blender that crushes food by rotating a blade, a rotation speed of a motor that rotates the blade is determined according to an operation mode set by a user and while the blender crushes food. When the food is rapidly crushed or the connection between the blade and the motor is disconnected and thus the motor is idle, a load state of the blender, which is the wireless power reception apparatus side, may change rapidly, and the same situation may occur in the case of small cooking appliances such as a juicer for squeezing fruit or vegetable juice or a kneader for mixing a highly viscous material.

As such, while power is supplied from the wireless power transmission apparatus, when a load state of the wireless power reception apparatus such as small cooking appliances rapidly changes from a full load state to a light load state or no load state, an overvoltage may be applied to the wireless power reception apparatus.

However, when the wireless power transmission apparatus simply adjusts a level of output power based on the change of power supplied to the wireless power transmission apparatus or data received from the wireless power reception apparatus without a specific determination on the change in a load state of the wireless power reception apparatus, if a load state of the wireless power reception apparatus changes, there is a problem that an overvoltage is applied to elements provided in the wireless power reception apparatus, thereby damaging the elements.

Further, even when the wireless power transmission apparatus receives data on a voltage applied to the element from the wireless power reception apparatus and monitors whether an overvoltage is applied to the elements of the wireless power reception apparatus, if the wireless power transmission apparatus checks that an overvoltage is applied to elements of the wireless power reception apparatus, there is a problem that the elements of the wireless power reception apparatus are damaged by the overvoltage.

Moreover, when data transmission from the wireless power reception apparatus is delayed or data transmission fails, the wireless power transmission apparatus has a problem in that there is no method of preventing damage to the elements of the wireless power reception apparatus due to application of an overvoltage.

SUMMARY

The present disclosure is directed to a wireless power transmission apparatus capable of actively determining a load state of a wireless power reception apparatus and a method of operating the same.

The wireless power transmission apparatus and the method of operating the same can adjust a level of power transmitted to the wireless power reception apparatus according to a load state of the wireless power reception apparatus regardless of whether data on a voltage are received from the wireless power reception apparatus.

The wireless power transmission apparatus and the method of operating the same can actively output a warning message when a load state of the wireless power reception apparatus is abnormal.

According to one aspect of the subject matter described in this application, a wireless power transmission apparatus includes a transmission coil configured to transmit power to a wireless power reception apparatus, an inverter that includes a plurality of switching elements and that is configured to output a current of a predetermined frequency to the transmission coil through an operation of the plurality of switching elements, and a controller. The controller can be configured to calculate an output level of power transmitted through the transmission coil, determine a load state of the wireless power reception apparatus based on a target level of power transmitted through the transmission coil and the calculated output level, and control the inverter based on the determined load state of the wireless power reception apparatus.

Implementations according to this aspect can include one or more of the following features. For example, the controller can be configured to, based on the load state of the wireless power reception apparatus being normal, control the inverter according to the target level, and based on the load state of the wireless power reception apparatus being abnormal, control the inverter according to a predetermined power level that is lower than the target level.

In some examples, the controller can be configured to, based on the load state of the wireless power reception apparatus being normal, control the inverter to adjust the output level to reach the target level, and based on the load state of the wireless power reception apparatus being abnormal, control the inverter to maintain the output level according to the predetermined power level. In some examples, the controller can be configured to, based on the target level being greater than or equal to a first reference level and the output level being less than a second reference level that is lower than the first reference level, determine a load state of the wireless power reception apparatus as abnormal, and based on the target level being less than the first reference level or the output level being greater than or equal to the second reference level, determine a load state of the wireless power reception apparatus as normal.

In some implementations, the controller can be configured to, based on a difference between the target level and the output level being greater than or equal to a predetermined difference, determine a load state of the wireless power reception apparatus as abnormal, and based on the difference being less than the predetermined difference, determine a load state of the wireless power reception apparatus as normal.

In some implementations, the wireless power transmission apparatus can further include a communication unit configured to communicate with the wireless power reception apparatus. The controller can be configured to receive, from the wireless power reception apparatus, data regarding the target level through the communication unit, and determine a new target level based on the received data regarding the target level. In some examples, the controller can be configured to receive, from the wireless power reception apparatus, data regarding an overvoltage, and determine a load state of the wireless power reception apparatus based on the received data regarding the overvoltage.

In some examples, the controller can be configured to, based on the data regarding the overvoltage being received from the wireless power reception apparatus, determine a load state of the wireless power reception apparatus as abnormal, and based on the data regarding the overvoltage not being received from the wireless power reception apparatus, determine a load state of the wireless power reception apparatus based on the target level and the output level.

In some implementations, the wireless power transmission apparatus can further include a current detector configured to detect a current output from the inverter, and a voltage detector configured to detect a voltage applied to an output terminal of the inverter. The controller can be configured to calculate the output level based on a current value detected through the current detector and a voltage value detected through the voltage detector. In some implementations, the wireless power transmission apparatus can further include an output unit. The controller can be configured to output a warning message through the output unit based on the load state of the wireless power reception apparatus being abnormal.

According to another aspect of the subject matter described in this application, a method of operating a wireless power transmission apparatus includes calculating an output level of power transmitted, to a wireless power reception apparatus, through a transmission coil included in the wireless power transmission apparatus, determining a load state of the wireless power reception apparatus based on a target level of power transmitted through the transmission coil and the calculated output level, and controlling an inverter included in the wireless power transmission apparatus based on the determined load state of the wireless power reception apparatus.

Implementations according to this aspect can include one or more following features. For example, controlling an inverter can include, based on the load state of the wireless power reception apparatus being normal, controlling the inverter according to the target level, and based on the load state of the wireless power reception apparatus being abnormal, controlling the inverter according to a predetermined power level that is lower than the target level.

In some examples, controlling the inverter according to the target level can include controlling the inverter to adjust the output level to reach the target level, and controlling the inverter according to a predetermined power level can include controlling the inverter to maintain the output level according to the predetermined power level. In some examples, determining a load state of the wireless power reception apparatus can include, based on the target level being greater than or equal to a first reference level and the output level being less than a second reference level that is lower than the first reference level, determining a load state of the wireless power reception apparatus as abnormal, and based on the target level being less than the first reference level or the output level being greater than or equal to the second reference level, determining a load state of the wireless power reception apparatus as normal.

In some implementations, determining a load state of the wireless power reception apparatus can further include, based on a difference between the target level and the output level being greater than or equal to a predetermined difference, determining a load state of the wireless power reception apparatus as abnormal, and based on the difference being less than the predetermined difference, determining a load state of the wireless power reception apparatus as normal.

In some implementations, the method can further include receiving, from the wireless power reception apparatus, data regarding the target level through a communication unit included in the wireless power transmission apparatus, and determining a new target level based on the received data regarding the target level. In some examples, the method can further include receiving, from the wireless power reception apparatus, data regarding overvoltage through the communication unit, and initially determining a load state of the wireless power reception apparatus based on the received data regarding the overvoltage.

In some examples, initially determining a load state can include, based on the data regarding the overvoltage being received from the wireless power reception apparatus, determining a load state of the wireless power reception apparatus as abnormal, and based on the data regarding the overvoltage not being received from the wireless power reception apparatus, determining a load state of the wireless power reception apparatus based on the target level and the output level.

In some implementations, calculating an output level can include detecting a current output from the inverter, detecting a voltage applied to an output terminal of the inverter, and calculating the output level based on the detected current output and the detected voltage. In some implementations, the method can further include outputting a warning message through an output unit included in the wireless power transmission apparatus based on the load state of the wireless power reception apparatus being abnormal.

DETAILED DESCRIPTION

Figure 1:
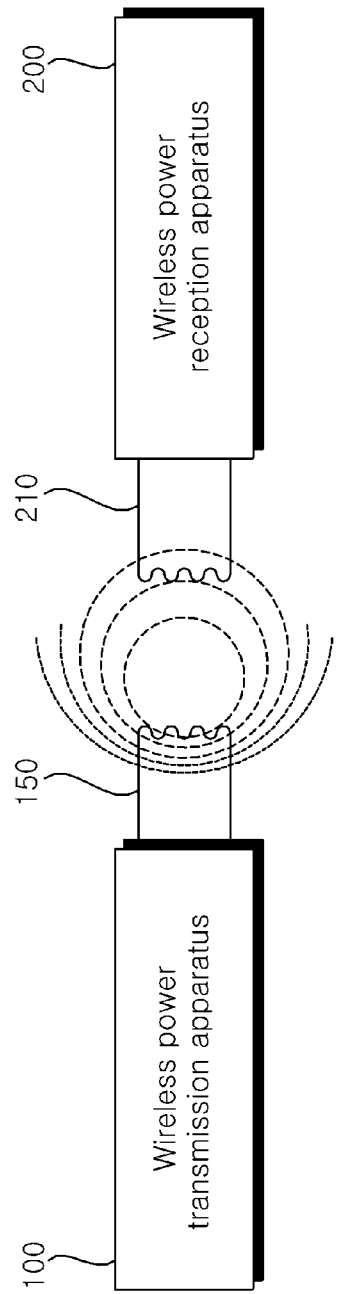
FIG. 1 is a block diagram illustrating an exemplary wireless power system.

FIG. 1 is a block diagram illustrating an exemplary wireless power system.

Referring to FIG. 1, a wireless power system 10 can include a wireless power transmission apparatus 100 for wirelessly transmitting power and a wireless power reception apparatus 200 for receiving the transmitted power.

The wireless power transmission apparatus 100 can wirelessly transfer power to the wireless power reception apparatus 200 using a magnetic induction phenomenon in which a current is induced in a coil 210 provided in the wireless power reception apparatus 200 according to a change in a magnetic field by a current flowing through a coil 150.

For example, the wireless power transmission apparatus 100 and the wireless power reception apparatus 200 can use a wireless power supply method of an electromagnetic induction method defined in Wireless Power Consortium (WPC) or Power Matters Alliance (PMA).

In some implementations, the wireless power transmission apparatus 100 and the wireless power reception apparatus 200 can use a wireless power supply method of a magnetic resonance method defined in Alliance for Wireless Power (A4WP).

Hereinafter, in order to distinguish the coil 150 provided in the wireless power transmission apparatus 100 and the coil 210 provided in the wireless power reception apparatus 200, the coil 150 provided in the wireless power transmission apparatus 100 can refer to a transmission coil, and the coil 210 provided in the wireless power reception apparatus 200 can to a reception coil.

In some implementations, the wireless power transmission apparatus 100 can transmit power to a plurality of wireless power reception apparatuses 200. For example, the wireless power transmission apparatus 100 can transmit power to the plurality of wireless power reception apparatuses 200 according to a time division method or different frequency bands allocated to each of the plurality of wireless power reception apparatuses 200.

A number of wireless power reception apparatuses 200 that can receive power from the wireless power transmission apparatus 100 can be determined adaptively in consideration of an amount of power required for each of the plurality of wireless power reception apparatuses 200 and an amount of available power of the wireless power transmission apparatus 100.

The wireless power reception apparatus 200 can receive power transmitted from the wireless power transmission apparatus 100. For example, the wireless power reception apparatus 200 can be a small cooking appliance such as a citrus press, a hand blender, a blender, a juicer, a kneader, a smart pan, an electric kettle, and a rice cooker.

The wireless power transmission apparatus 100 and the wireless power reception apparatus 200 can communicate with each other. In some implementations, the wireless power transmission apparatus 100 and the wireless power reception apparatus 200 can perform one-way communication or half-duplex communication.

For example, the communication method can be an in-band communication method using the same frequency band as that of an operating frequency used for wireless power transmission and/or an out-of-band communication method using a frequency band different from that of an operating frequency used for wireless power transmission.

Data transmitted and received between the wireless power transmission apparatus 100 and the wireless power reception apparatus 200 can include data on a state of the apparatus, data on power usage, data on battery charging, data on a voltage and/or a current, data on a control command, and the like.

When a cooking tool such as a metal pot is located adjacent to the wireless power transmission apparatus 100, a magnetic field generated by a current flowing through the transmission coil 150 may pass through the cooking tool. In this case, by the magnetic field passing through the cooking tool, an eddy current can be provided in the cooking tool. As an eddy current flows to the cooking tool, heat can be generated and thus the cooking tool can also be heated, and contents within the cooking tool can also be heated. In some implementations, the transmission coil 150 provided in the wireless power transmission apparatus 100 can refer to a transmission coil.

Further, for a small cooking appliance that does not have a reception coil 210 for receiving power, such as a wireless electric port, a heating part of the small cooking appliance can be heated by a current flowing through the transmission coil 150 of the wireless power transmission apparatus 100.

For example, the wireless power transmission apparatus 100 can operate as a power supply apparatus for supplying power to the wireless power reception apparatus 200 or can operate as a cooking appliance of an induction method that heats a cook tool through an electromagnetic induction heating method.

Figure 2A:
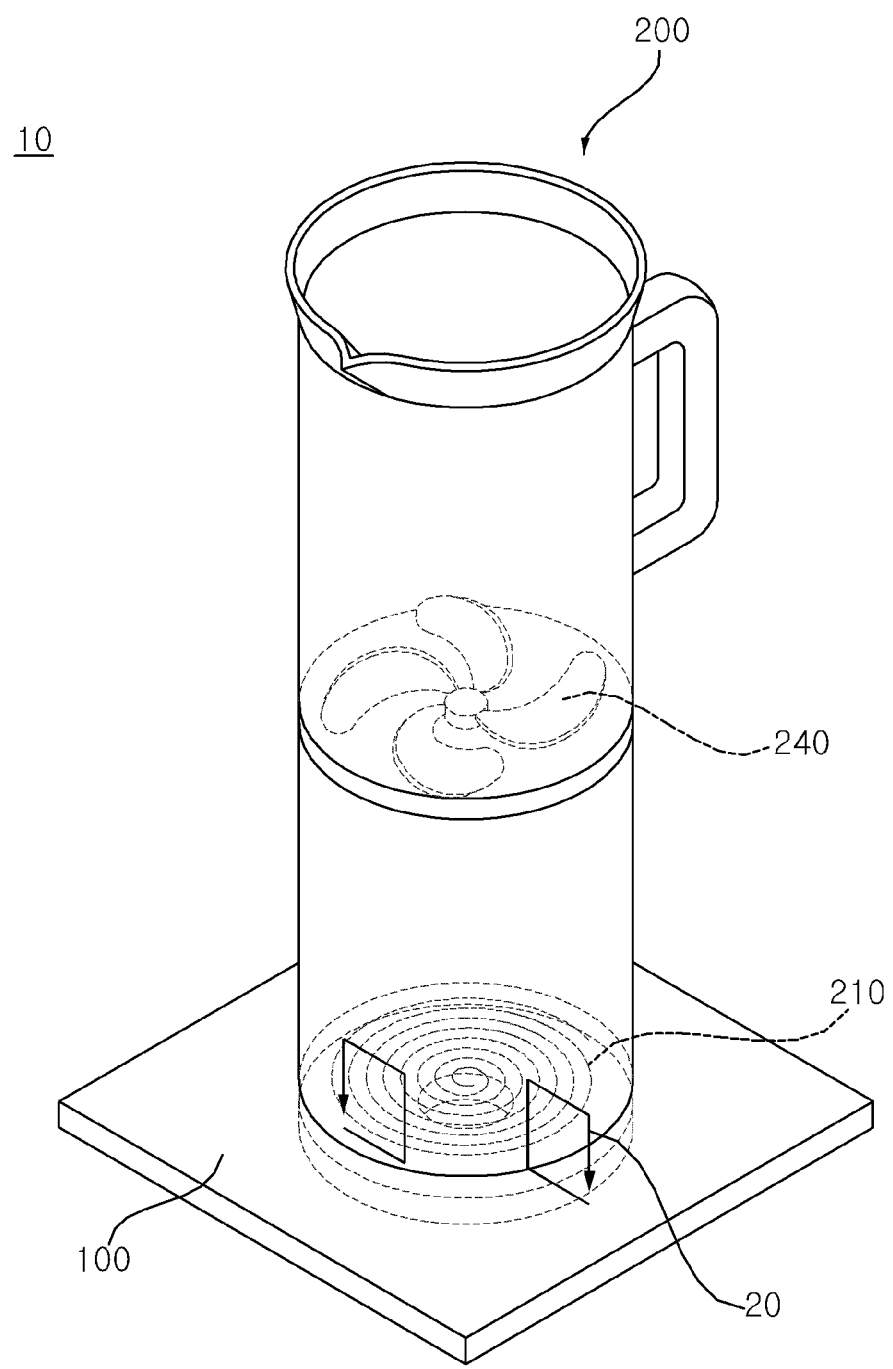
FIGS. 2A and 2B are diagrams illustrating exemplary components included in the wireless power system.
Figure 2B:
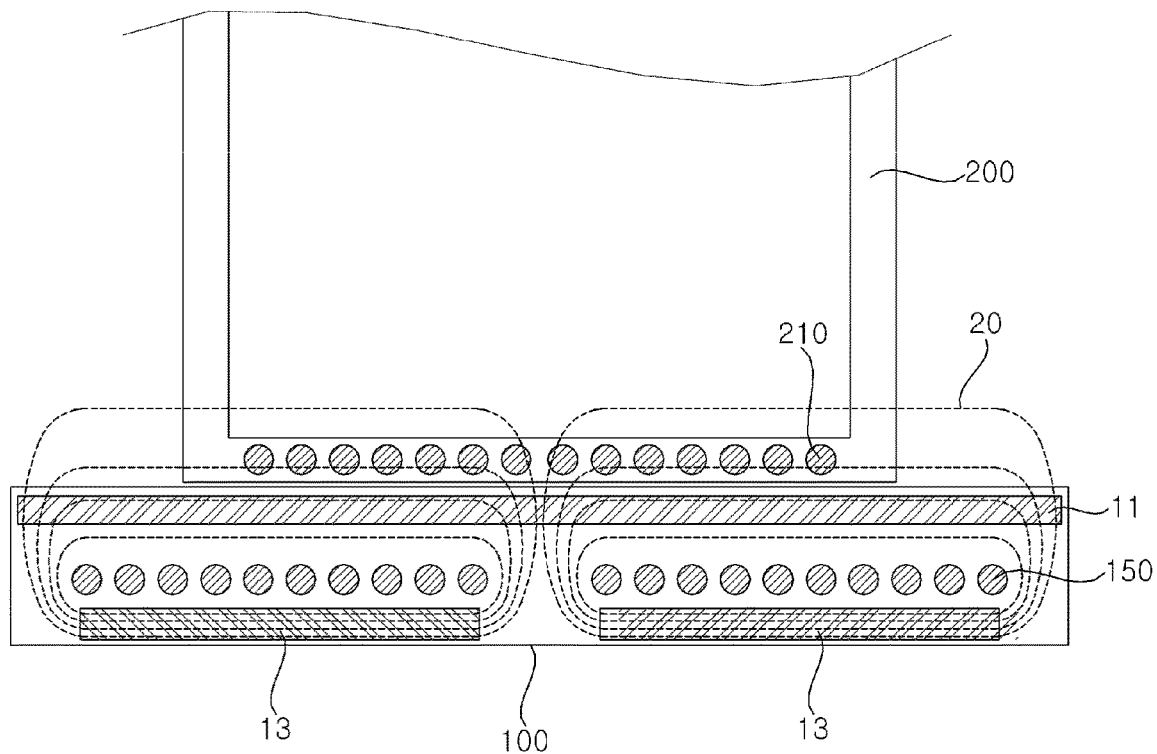

FIGS. 2A and 2B are diagrams illustrating components included in the wireless power system 10.

FIG. 2A is a diagram illustrating a top perspective view of a wireless power transmission apparatus and a wireless power reception apparatus, and FIG. 2B is a diagram illustrating a cross-sectional view of a wireless power transmission apparatus and a wireless power reception apparatus.

Referring to FIGS. 2A and 2B, the wireless power reception apparatus 200 can be located adjacent to the wireless power transmission apparatus 100, and the wireless power reception apparatus 200 can receive power wirelessly from the wireless power transmission apparatus 100.

As illustrated in FIG. 2B, the wireless power transmission apparatus 100 can include an upper glass 11, and the wireless power reception apparatus 200 can be located on the upper glass 11.

The upper glass 11 can be configured to protect the interior of the wireless power transmission apparatus 100 and to support the wireless power reception apparatus 200. For example, the upper glass 11 can be made of tempered glass of a ceramic material synthesized with various minerals.

The transmission coil 150 can be disposed close to a lower portion of the upper glass 11.

A magnetic field 20 can be generated by a current flowing through the transmission coil 150 of the wireless power transmission apparatus 100, and a current can be induced in the reception coil 210 of the wireless power reception apparatus 200 by the magnetic field 20.

The wireless power transmission apparatus 100 can further include a ferrite 13. The ferrite 13 can be made of a material having high permeability. The ferrite 13 can be disposed inside the wireless power transmission apparatus 100.

The ferrite 13 can induce a magnetic field generated in the transmission coil 150 to flow through the ferrite 13 without being radiated so that a leakage magnetic field can be reduced and directionality of the magnetic field can be maximized.

The wireless power reception apparatus 200 can receive power through a magnetic field generated by a current flowing through the transmission coil 150.

The wireless power reception apparatus 200 can supply power to each component provided in the wireless power reception apparatus 200 using power received through the reception coil 210 and control an operation of each component. For example, as illustrated in FIG. 2A, when the wireless power reception apparatus 200 is a blender, the wireless power reception apparatus 200 can rotate a motor and a blade, which are a load 240 using power received through the reception coil 210.

Figure 3A:
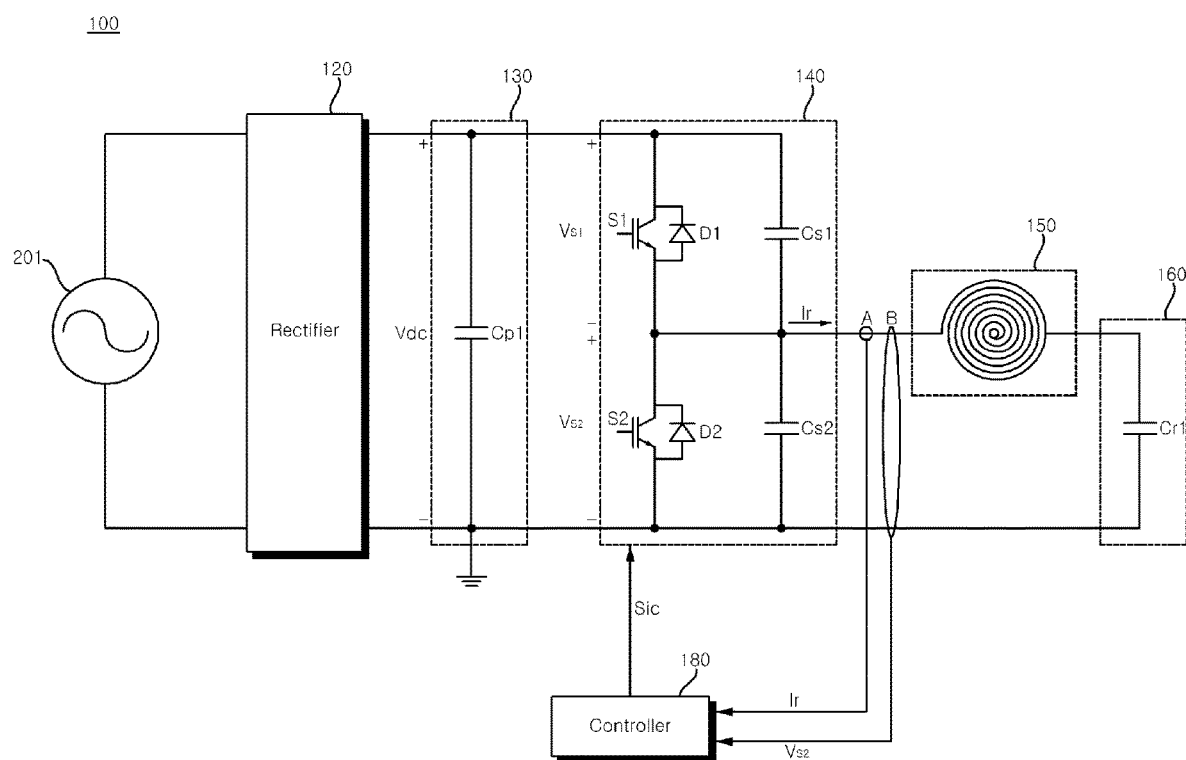
FIGS. 3A and 3B are internal circuit diagrams of the exemplary wireless power transmission apparatus of FIG. 1.
Figure 3B:
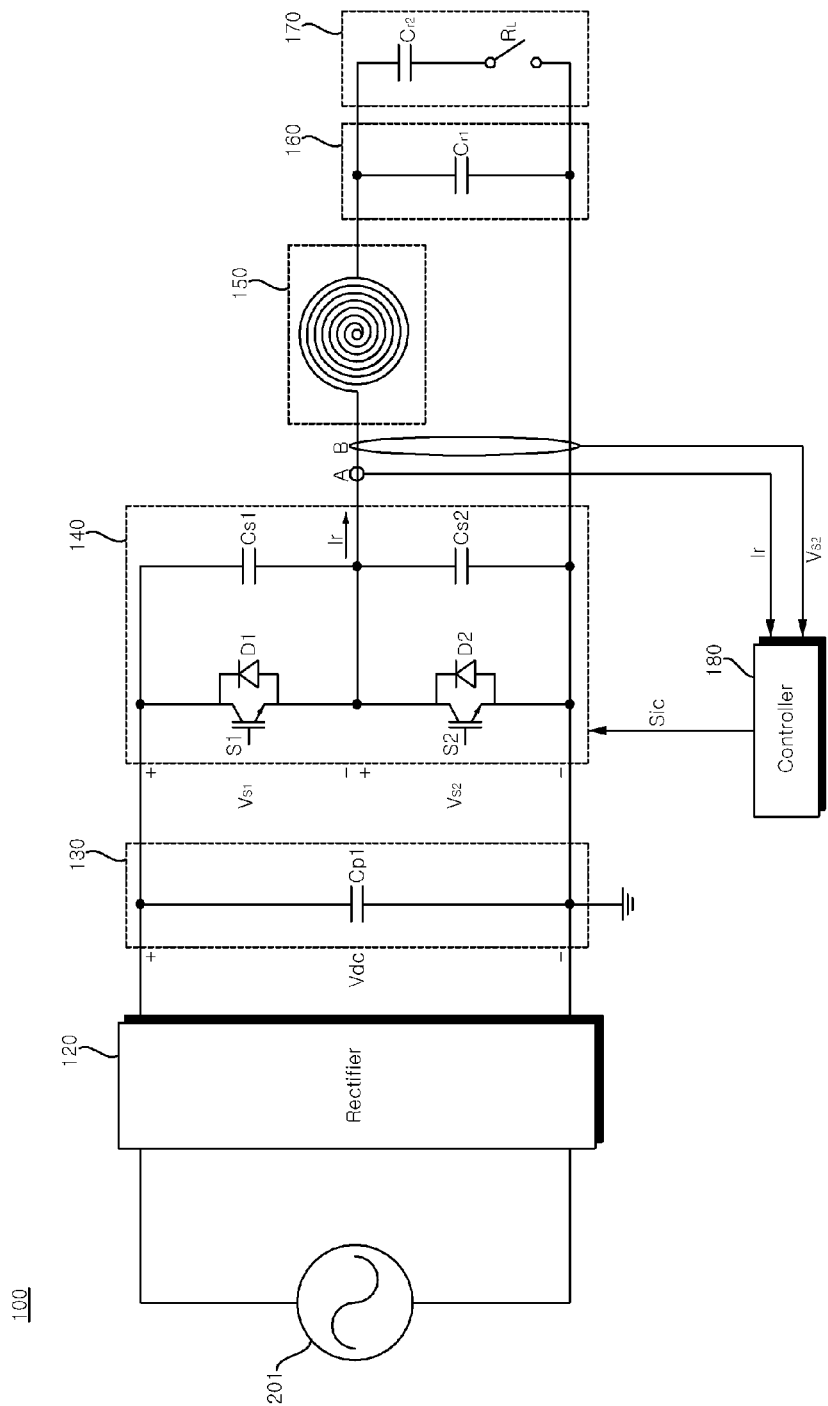

FIGS. 3a and 3b are internal circuit diagrams of the wireless power transmission apparatus of FIG. 1.

Referring to FIGS. 3A and 3B, the wireless power transmission apparatus 100 can include a rectifier 120, a dc terminal capacitor 130, an inverter 140, a transmission coil 150, a resonator 160, and/or a controller 180 connected to an external power source.

The rectifier 120 can rectify and output AC power input from a commercial power supply 201, which is an external power source. The rectifier 120 can convert an AC voltage supplied through the commercial power supply 201 into a DC voltage. In some implementations, the commercial power supply 201 may be a single-phase AC power supply or a three-phase AC power supply. For example, the rectifier 120 can include a bridge diode in which a total of two or three pairs of upper and lower arm diode elements, each of which is a pair of upper-arm diode elements and lower-arm diode elements connected in series with each other, are connected in parallel with each other. In some implementations, the rectifier 120 can further include a plurality of switching elements.

The dc terminal capacitor 130 can be connected to a dc terminal, which is an output terminal of the rectifier 120, and can smooth and store DC power supplied from the rectifier 120.

Referring to FIGS. 3A and 3B, one element Cp1 is illustrated as the dc terminal capacitor 130. In some implementations, a plurality of elements can be provided to ensure device stability.

The inverter 140 can be provided with a plurality of switching elements S1 and S2 and can be configured to convert DC power smoothed and stored in the dc terminal capacitor 130 into AC power of a predetermined frequency to output AC power to the transmission coil 150 by an on/off operation of the switching elements S1 and S2. For example, when the switching elements S1 and S2 are insulated gate bipolar transistors (IGBTs), a driving signal generated by a pulse width modulation (PWM) signal can be output from the controller 180 to be input to gate terminals of the switching elements S1 and S2. In some implementations, by the on/off operation of the switching elements S1 and S2 according to the driving signal, a high-frequency current can be output from the inverter 140 and flow through the transmission coil 150.

When a high-frequency current output from the inverter 140 flows through the transmission coil 150, a magnetic field can be generated in the transmission coil 150, and a current of a predetermined frequency can be induced in the reception coil 210 of the wireless power reception apparatus 200 by the magnetic field generated in the transmission coil 150.

The inverter 140 can further include a plurality of snubber capacitors Cs1 and Cs2. The plurality of snubber capacitors Cs1 and Cs2 can be connected to the plurality of switching elements S1 and S2, respectively.

The snubber capacitors Cs1 and Cs2 can be provided to control and reduce an inrush current or a transient voltage generated in the switching elements S1 and S2, and can be used for removing electromagnetic wave noise in some situations.

The snubber capacitors Cs' and Cs2 can adjust a saturation voltage increase rate during turn-off of the switching elements S1 and S2 to affect an energy loss during turn-off.

In some implementations, the transmission coil 150 can have a round shape, a circular sector shape, or a polygonal shape such as a triangular shape or a rectangular shape.

The resonator 160 can include a first resonance capacitor Cr1 connected between a dc terminal, which is an output terminal of the rectifier 120, and the transmission coil 150. For example, the first resonance capacitor Cr1 can have a first end connected to the transmission coil 150 and a second connected to the dc terminal capacitor 130.

A resonance frequency of the wireless power transmission apparatus 100 can be determined according to the capacitance of the resonator 160. For example, the resonance frequency of the wireless power transmission apparatus 100 can be determined according to the inductance of the transmission coil 150 and the capacitance of the resonator 160.

Further, a resonance curve can be formed around a resonance frequency determined by the inductance of the transmission coil 150 and the capacitance of the resonator 160. For example, the resonance curve can be a curve representing output power according to a frequency.

According to the inductance of the transmission coil 150 and the capacitance of the resonator 160, a quality factor Q can be determined, and a resonance curve can be formed differently according to the quality factor Q.

Therefore, according to the inductance of the transmission coil 150 and the capacitance of the resonator 160, the wireless power transmission apparatus 100 can have different output characteristics, and a frequency that outputs maximum power can refer to a resonance frequency.

The resonator 160 can include a plurality of first resonance capacitors Cr1. In some implementations, capacitances of the plurality of first resonance capacitors Cr1 can be the same. For example, a first capacitor of the plurality of first resonance capacitors Cr1 can have a first end connected to one end of the dc terminal capacitor 130 and a second end connected to the transmission coil 150, and a second capacitor of the plurality of first resonance capacitors Cr1 can have a first end connected to the other end of the dc terminal capacitor 130, and a second end connected to the transmission coil 150.

The wireless power transmission apparatus 100 can use a frequency band greater than that of the resonance frequency based on the resonance frequency of the resonance curve, and decrease the frequency to increase a level of transmitted power, or increase the frequency to decrease a level of transmitted power. For example, the wireless power transmission apparatus 100 can determine any one of the frequencies in a frequency band between 20 kHz to 75 kHz as a switching frequency of the switching elements S1 and S2 provided in the inverter 140, and control to the switching elements S1 and S2 to be alternately turned on/off according to the determined switching frequency. For example, the wireless power transmission apparatus 100 can determine any one of the frequencies in the frequency band between 20 kHz to 75 kHz as a switching frequency of the switching elements S1 and S2 provided in the inverter 140 and control the switching elements S1 and S2 to be alternately turned on/off according to the determined switching frequency.

When the wireless power transmission apparatus 100 operates as an induction-type cooking appliance, the wireless power transmission apparatus 100 can decrease the frequency to increase a heating power stage or can increase the frequency to decrease a heating power stage.

As illustrated in FIG. 3B, the wireless power transmission apparatus 100 can further include a second resonator 170.

The second resonator 170 can include a changeover switch RL and a second resonance capacitor Cr2. The second resonator 170 can be connected in parallel to the resonator 160.

The changeover switch RL can be turned on/off according to the control of the controller 180. Referring to FIG. 3B, the changeover switch RL can be a relay turned on/off based on a current flowing through the coil. In some implementations, the changeover switch RL can be a transistor element. For example, the changeover switch RL can be a Bipolar Junction Transistor (BJT) or a Field Effective Transistor (FET).

The second resonance capacitor Cr2 can be connected in parallel to a first resonance capacitor Cr1 according to an operation of the changeover switch RL. For example, when the changeover switch RL is turned on, the second resonance capacitor Cr2 can be connected in parallel to the first resonance capacitor Cr1.

The second resonator 170 can be configured to change a resonant frequency of the wireless power transmission apparatus 100.

For example, when the second resonance capacitor Cr2 is connected in parallel to the first resonance capacitor Cr1 according to an operation of the changeover switch RL, the combined capacitance of the first resonance capacitor Cr1 and the second resonance capacitor Cr2 can increase, and as the combined capacitance increases, a resonant frequency of the wireless power transmission apparatus 100 can decrease.

The changeover switch RL can be turned on/off according to an operation mode of the wireless power transmission apparatus 100. For example, when an operation mode of the wireless power transmission apparatus 100 is a power transmission mode of wirelessly transmitting power, the plurality of changeover switches RL can be turned on so that a resonance frequency of the wireless power transmission apparatus 100 decreases. For example, when the operation mode of the wireless power transmission apparatus 100 is an induction heating mode operating as an induction-type cooking appliance, a plurality of changeover switches RL can be turned off so that a resonant frequency of the wireless power transmission apparatus 100 increases compared to that in the power transmission mode.

When the resonator 160 includes a plurality of first resonance capacitors Cr1, the second resonator 170 can include a plurality of second resonance capacitors Cr2 and a plurality of changeover switches RL. In some implementations, capacitances of the plurality of second resonance capacitors Cr2 can be the same.

The plurality of second resonance capacitors Cr2 can be disposed to be connected in parallel to the plurality of first resonance capacitors Cr1, respectively. In some implementations, when turning on, the plurality of changeover switches RL can be connected in series to the plurality of second resonance capacitors Cr2, respectively, so that the plurality of second resonance capacitors Cr2 are connected in parallel to the plurality of first resonance capacitors Cr1, respectively.

The plurality of changeover switches RL can be simultaneously turned on/off according to the control of the controller 180.

The controller 180 can be connected to each component provided in the wireless power transmission apparatus 100 to control an overall operation of each component.

The controller 180 can determine an operation mode of the wireless power transmission apparatus 100. For example, the controller 180 can determine an operation mode of the wireless power transmission apparatus 100 according to a user input.

In some implementations, the wireless power transmission apparatus 100 can further include an input unit. The input unit can include various switches for manipulating an operation control of the wireless power transmission apparatus 100. For example, the input unit can include an operation switch for selecting on/off or an operation mode of the wireless power transmission apparatus 100.

The controller 180 can determine an operation mode of the wireless power transmission apparatus 100 according to a user input received through the input unit.

The controller 180 can control an operation of the inverter 140 so that an AC current flows through the transmission coil 150. In some implementations, the controller 180 can control an operation of the inverter 140 according to an operation mode of the wireless power transmission apparatus 100. For example, when an operation mode of the wireless power transmission apparatus 100 is a power transmission mode, the controller 180 can control an on/off operation of the switching elements S1 and S2 so as to transmit power to the wireless power reception apparatus 200 through the transmission coil 150. For example, when an operation mode of the wireless power transmission apparatus 100 is an induction heating mode, the controller 180 can control an on/off operation of the switching elements S1 and S2 so that a magnetic field for heating the cooking tool is generated.

The controller 180 may include a driver for generating a driving signal Sic to output the driving signal Sic to the switching elements S1 and S2 of the inverter 140 based on a PWM generator that generates a pulse width modulation (PWM) signal and a PWM signal.

The controller 180 can calculate a level (hereinafter, output level) of power transmitted through the transmission coil 150.

The controller 180 can calculate an output level of power transmitted through the transmission coil 150 based on (i) a current output from the inverter 140 and flowing through the transmission coil 150 and (ii) a voltage applied to an output terminal of the inverter 140.

In some implementations, the wireless power transmission apparatus 100 can further include a current detector A for detecting a current output from the inverter 140 and a voltage detector B for detecting a voltage applied to an output terminal of the inverter 140.

The current detector A can include a current transformer, a shunt resistor, and the like so as to detect a current output from the inverter 140, and the detected current Ir can be input to the controller 180. For example, a detection value of the current Ir detected through the current detector A can be a discrete signal of a pulse form and can be input to the controller 180.

The voltage detector B can include a voltage transformer VT, a resistance element, an OP AMP, or the like so as to detect a voltage applied to the output terminal of the inverter 140. A detection value of a voltage Vs2 detected through the voltage detector B can be input to the controller 180. For example, a detection value of the voltage Vs2 detected through the voltage detector B can be a discrete signal of a pulse form and can be input to the controller 180.

The wireless power transmission apparatus 100 can further include a communication unit. The communication unit can include at least one communication module (e.g., a transceiver) for communication with the wireless power reception apparatus 200.

Hereinafter, in order to distinguish the communication unit provided in the wireless power transmission apparatus 100 and the communication unit provided in the wireless power reception apparatus 200, the communication unit provided in the wireless power transmission apparatus 100 can refer to a transmission side communication unit and the communication unit provided in the wireless power reception apparatus 200 can refer to a reception side communication unit.

The transmission side communication unit can include first and second transmission side communication units.

The first transmission side communication unit can communicate with a first communication method. The first transmission side communication unit can transmit a signal including data on a state of the apparatus, data on power usage, and the like to the wireless power reception apparatus 200, and receive a signal including data on a state of the apparatus, data on power usage, data on battery charging, and the like from the wireless power reception apparatus 200.

The second transmission side communication unit can communicate with the wireless power reception apparatus 200 in a second communication method different from the first communication method. The second transmission side communication unit can transmit a signal including data on a state of the apparatus, data on power usage, and the like to the wireless power reception apparatus 200, and receive a signal including data on a state of the apparatus, data on power usage, and data on battery charging, and the like from the wireless power reception apparatus 200.

The first and second transmission side communication units can further include a modulator and demodulator for modulating/demodulating a signal transmitted from the wireless power transmission apparatus 100 and a signal received from the wireless power reception apparatus 200.

The first and second transmission side communication units can further include a filter unit that filters a signal received from the wireless power reception apparatus 200. In some implementations, the filter unit can include a band pass filter (BPF).

In some implementations, the first communication method can be an in-band communication method. For example, when the first transmission side communication unit communicates in an in-band communication method, the first transmission side communication unit and the transmission coil 150 can be implemented into one configuration, and the first transmission side communication unit can communicate with the wireless power reception apparatus 200 through the transmission coil 150.

In some implementations, the second communication method can be an out-of-band communication method. For example, when the second transmission side communication unit communicates in an out-of-band communication method, the second transmission side communication unit and the transmission coil 150 can be implemented into separate configurations, and the second transmission side communication unit can communicate with the wireless power reception apparatus 200 through a separate communication module.

In some implementations, a communication module used in an out-of-band communication method can use a short range communication method such as BLUETOOTH, ZIGBEE, wireless LAN (WLAN), and Near Field Communication (NFC).

The communication method used in the wireless power transmission apparatus 100 can be changed to at least one of the first communication method or second communication method based on data regarding the wireless power reception apparatus 200.

The controller 180 can transmit and receive data to and from the wireless power reception apparatus 200 through the transmission side communication unit.

The controller 180 can control an operation of the inverter 140 based on a command value (hereinafter, target level) for power transmitted through the transmission coil 150.

The controller 180 can compare an output level of power transmitted through the transmission coil 150 and a target level of power transmitted through the transmission coil 150, and control an operation of the inverter 140 according to the comparison result.

For example, when the output level is lower than the target level, the controller 180 can control an operation of the inverter 140 so that the output level reaches the target level. In some implementations, the controller 180 can decrease the switching frequency of the switching elements S1 and S2 of the inverter 140 so as to increase the output level.

For example, when the output level is higher than the target level, the controller 180 can control an operation of the inverter 140 so that the output level reaches the target level. In some implementations, the controller 180 can increase the switching frequency of the switching elements S1 and S2 of the inverter 140 so that the output level decreases.

For example, when the output level corresponds to the target level, the controller 180 can control an operation of the inverter 140 so that the output level is maintained. In some implementations, the controller 180 can maintain the switching frequency of the switching elements S1 and S2 of the inverter 140 so that the output level is maintained.

The controller 180 can determine a target level. For example, the controller 180 can determine a target level based on data received from the wireless power reception apparatus 200.

The controller 180 can determine a target level based on data regarding at least one of a voltage, a current, or power received from the wireless power reception apparatus 200. For example, the controller 180 can determine a target level based on data regarding a voltage Vo (hereinafter, dc terminal voltage) applied to the dc terminal capacitor (230 of FIG. 4) among configurations of the wireless power reception apparatus 200.

The controller 180 can determine a target level based on data on the target level received from the wireless power reception apparatus 200. For example, when data designating a specific target level is received from the wireless power reception apparatus 200, the controller 180 can change the target level to a specific target level. For example, when data requesting an increase in a target level is received from the wireless power reception apparatus 200, the controller 180 can increase the target level by a preset level from a current target level, and when data requesting a decrease in the target level is received from the wireless power reception apparatus 200, the controller 180 can decrease the target level by a preset level from a current target level.

The controller 180 can determine an operating state of the wireless power reception apparatus 200. For example, the controller 180 can determine whether an overvoltage is applied to the wireless power reception apparatus 200 based on data regarding the dc terminal voltage Vo applied to the dc terminal capacitor (230 of FIG. 4) received from the wireless power reception apparatus 200. For example, the controller 180 can determine whether an overvoltage is applied to the wireless power reception apparatus 200 based on data regarding an overvoltage received from the wireless power reception apparatus 200.

The controller 180 can determine a load state of the wireless power reception apparatus 200. For example, when the load 240 of the wireless power reception apparatus 200 rapidly changes to a light load state or no load state while operating in a full load state, power transmission and reception efficiency of the wireless power transmission apparatus 100 and the wireless power reception apparatus 200 can be drastically lowered. Further, a change such as a decrease in a current flowing through the transmission coil 150 of the wireless power transmission apparatus 100 can occur, and thus an output level of power transmitted from the wireless power transmission apparatus 100 can be significantly lowered compared with the target level.

The controller 180 can determine a load state of the wireless power reception apparatus 200 based on data indicating a load state received from the wireless power reception apparatus 200.

The controller 180 can determine a load state of the wireless power reception apparatus 200 based on the output level and the target level. For example, when the target level is higher than the output level and a difference between the target level and the output level is greater than or equal to a predetermined difference, the controller 180 can determine the load state of the wireless power reception apparatus 200 as abnormal. For example, when the target level is greater than or equal to a preset first reference level and the output level is less than a second reference level, the controller 180 can determine the load state of the wireless power reception apparatus 200 as abnormal. In some implementations, the first reference level can be higher than the second reference level.

The predetermined difference and/or the first and second reference levels, which are the criteria for determining a load state of the wireless power reception apparatus 200, can be variously changed according to settings.

The controller 180 can control an operation of the inverter 140 according to a load state of the wireless power reception apparatus 200.

When a load state of the wireless power reception apparatus 200 is normal, the controller 180 can control an operation of the inverter 140 according to a target level. For example, when a load state of the wireless power reception apparatus 200 is normal, the controller 180 can control an operation of the inverter 140 so that the output level reaches the target level.

When a load state of the wireless power reception apparatus 200 is abnormal, the controller 180 can control an operation of the inverter 140 according to a predetermined power level lower than the target level. For example, when a load state of the wireless power reception apparatus 200 is abnormal, the controller 180 can control an operation of the inverter 140 so that the output level is maintained corresponding to a predetermined power level lower than the target level.

The wireless power transmission apparatus 100 can further include an output unit. The output unit can include a display device such as a display and a light emitting diode (LED), and/or an audio device such as a speaker and a buzzer.

The controller 180 can output a message for the wireless power transmission apparatus 100 through the output unit. For example, the controller 180 can output a message about an operation mode of the wireless power transmission apparatus 100 through the display.

The controller 180 can output a message for the wireless power reception apparatus 200 through the output unit. For example, when a load state of the wireless power reception apparatus 200 is abnormal, the controller 180 can output a warning message about the load state of the wireless power reception apparatus 200 through the speaker.

Figure 4:
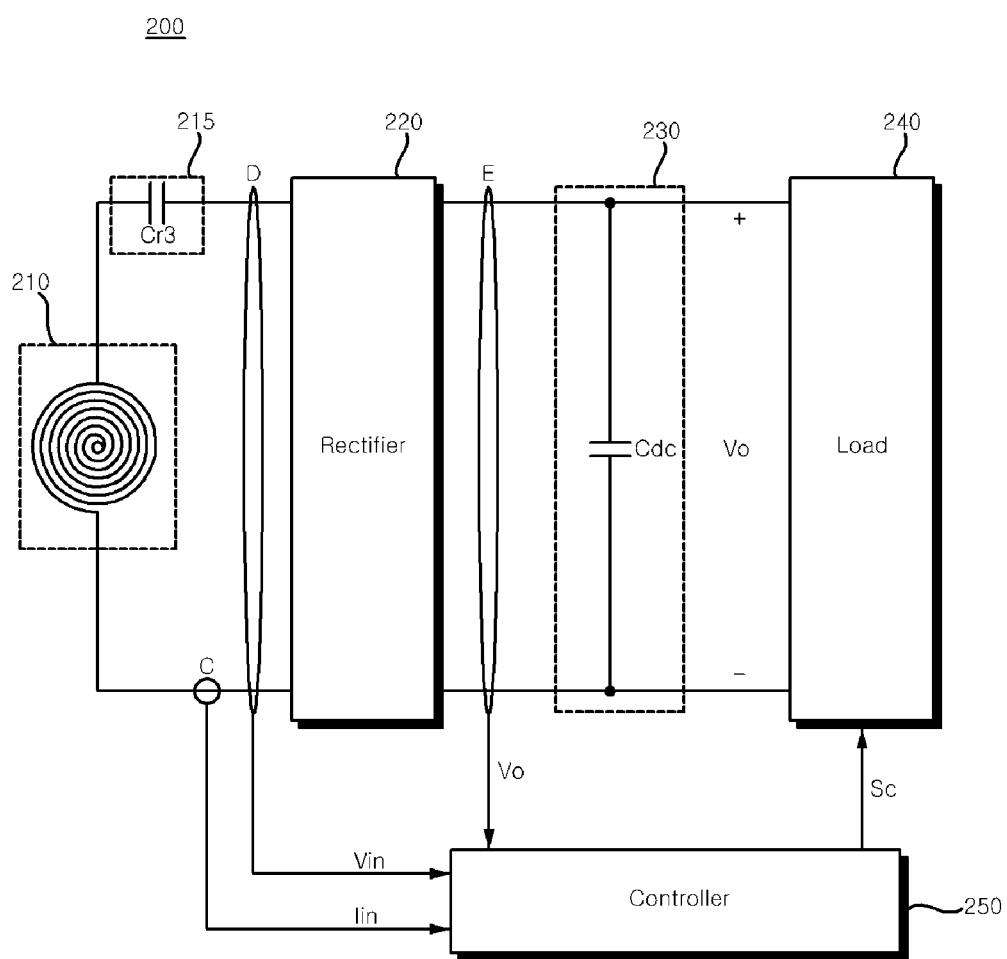
FIG. 4 is an internal circuit diagram of the exemplary wireless power reception apparatus of FIG. 1.

FIG. 4 is an internal circuit diagram of the wireless power reception apparatus 200 of FIG. 1.

Referring to FIG. 4, the wireless power reception apparatus 200 can include a reception coil 210, a resonator 215, a rectifier 220, a dc terminal capacitor 230, and/or a load 240.

The reception coil 210 can receive power transmitted from the wireless power transmission apparatus 100. For example, a current of a predetermined frequency can be induced in the reception coil 210 by a magnetic field generated in the transmission coil 150, and an induced electromotive force according to the induced current can be supplied as power for an operation of the wireless power reception apparatus 200.

The resonator 215 can include a third resonance capacitor Cr3 for forming a resonant circuit with the wireless power transmission apparatus 100. The third resonance capacitor Cr3 can be connected in series to the reception coil 210.

A resonant frequency of power reception can be determined according to the capacitance of the resonator 215. For example, the resonance frequency of power reception can be determined according to the inductance of the reception coil 210 and the capacitance of the resonator 215.

In some implementations, a resonance frequency of power transmission and a resonance frequency of power reception can be the same, and an induced current having the same frequency as a frequency of a current flowing through the transmission coil 150 can flow through the reception coil 210.

The rectifier 220 can rectify and output power transferred from the reception coil 210. The rectifier 220 can convert an alternating current induced in the reception coil 210 by a magnetic field generated in the transmission coil 150 into a direct current.

The rectifier 220 can include a bridge diode, and further include a plurality of switching elements.

An element included in the rectifier 220 of the wireless power reception apparatus 200 can be different from an element included in the rectifier 120 of the wireless power transmission apparatus 100. For example, an element included in the rectifier 220 of the wireless power reception apparatus 200 can be an element corresponding to power of a high frequency (e.g., 32 kHz) transferred through the reception coil 210, and an element included in the rectifier 120 of the wireless power transmission apparatus 100 can be an element corresponding to power of a low frequency (e.g., 60 Hz) supplied through the commercial power supply 205.

The dc terminal capacitor 230 can be connected to a dc terminal, which is an output terminal of the rectifier 220, and smooth and store DC power supplied from the rectifier 220.

The dc terminal capacitor 230 can be connected to an input terminal of the load 240.

Referring to FIG. 4, one element Cdc is implemented for the dc terminal capacitor 230. In some implementations, a plurality of elements can be provided to ensure device stability.

The load 240 can be configured to operate based on power stored in the dc terminal capacitor 230.

For example, the load 240 can be a battery charged based on power stored in the dc terminal capacitor 230.

For example, the load 240 can include an inverter having a plurality of switching elements and for converting DC power smoothed and stored in the dc terminal capacitor 230 into AC power of a predetermined frequency to output AC power.

In some implementations, the load 240 can further include a motor that drives by AC power, a working coil that generates a magnetic field, and the like.

For example, when the wireless power reception apparatus 200 is a blender, the load 240 can further include a motor, and the wireless power reception apparatus 200 can crush food by rotating a blade connected to the motor using the motor rotating by AC power output from the inverter.

For example, when the wireless power reception apparatus 200 is a mini oven, the load 240 can further include a working coil, and the wireless power reception apparatus 200 can heat a cooking tool disposed adjacent to the working coil to heat food within the cooking tool by using the working coil generating a magnetic field by AC power output from the inverter.

The wireless power reception apparatus 200 can further include a reception side communication unit for communicating with the wireless power transmission apparatus 100.

The reception side communication unit can further include a first reception side communication unit and a second reception side communication unit. In some implementations, the first reception side communication unit can have the same configuration as or a configuration similar to the first transmission side communication unit included in the wireless power transmission apparatus 100. Further, the second reception side communication unit can have the same configuration as or a configuration similar to the second transmission side communication unit included in, for example, the wireless power transmission apparatus 100.

For example, the wireless power reception apparatus 200 can communicate with the wireless power transmission apparatus 100 with an in-band communication method through the first reception side communication unit.

For example, the wireless power reception apparatus 200 can communicate with the wireless power transmission apparatus 100 with an out-of-band communication method through the second reception side communication unit.

The wireless power reception apparatus 200 can further include a controller 250 connected to each component provided therein to control an overall operation of each component. In order to distinguish the controller 250 from the controller 180 included in the wireless power transmission apparatus 100, the controller 250 can refer to a reception side controller.

The reception side controller 250 can control an operation of the load 240. For example, when the load 240 includes an inverter and a motor, the reception side controller 250 can output a control signal Sc of controlling a switching operation of a plurality of switching elements included in the inverter of the load 240 to control a rotation of the motor.

The reception side controller 250 can transmit and receive data to and from the wireless power transmission apparatus 100 through the reception side communication unit.

For example, the reception side controller 250 can transmit and receive data regarding a state of the wireless power reception apparatus 200, data on power usage, data on battery charging, and the like to and from the wireless power transmission apparatus 100 through the reception side communication unit.

The wireless power reception apparatus 200 can further include a current detector C for detecting a current flowing through the reception coil 210, a first voltage detector D for detecting a voltage applied to an input terminal of the rectifier 220, and/or a second voltage detector E for detecting a voltage applied to the dc terminal capacitor 230.

The current detector C can include a current transformer, a shunt resistor, and the like so as to detect a current flowing through the reception coil 210, and a detected current Iin can be input to the reception side controller 250. For example, a detection value of the current Iin detected through the current detector C can be a discrete signal of a pulse form and can be input to the reception side controller 250.

The first voltage detector D can include a transformer, a resistance element, an OP AMP, or the like so as to detect a voltage applied to the input terminal of the rectifier 220. A detection value of a voltage Vin detected through the first voltage detector D can be input to the reception side controller 250. For example, a detection value of a voltage Vin detected through the first voltage detector D can be a discrete signal of a pulse form and can be input to the reception side controller 250.

The second voltage detector E can include a transformer, a resistance element, an OP AMP, or the like so as to detect a voltage applied to the dc terminal capacitor 230. A detection value of the dc terminal voltage Vo detected through the second voltage detector E can be input to the reception side controller 250. For example, a detection value of the dc terminal voltage Vo detected through the second voltage detector E can be a discrete signal of a pulse form and can be input to the reception side controller 250.

The reception side controller 250 can calculate a voltage applied to each component of the wireless power reception apparatus 200, a current flowing to each component, and/or power based on the detected value detected through the current detector C, the first voltage detector D, and/or the second voltage detector E. For example, the reception side controller 250 can calculate a voltage applied to the dc terminal capacitor 230 based on the detected value detected through the second voltage detector E.

The reception side controller 250 can transmit data regarding a voltage applied to each component of the wireless power reception apparatus 200, a current flowing to each component, and/or power to the wireless power transmission apparatus 100 through the reception side communication unit. For example, the reception side controller 250 can calculate power transmitted from the wireless power transmission apparatus 100 based on detection values detected through the current detector C and the first voltage detector D.

The reception side controller 250 can transmit data regarding a target level to the wireless power transmission apparatus 100 based on power transmitted from the wireless power transmission apparatus 100 and power required for an operation of the load 240. For example, the reception side controller 250 can determine power required for an operation of the load 240 according to an operation mode of the wireless power reception apparatus 200, and transmit data designating a specific target level required for the operation of the load 240 to the wireless power transmission apparatus 100.

In some implementations, the wireless power reception apparatus 200 designates a specific target level to be less than a predetermined level from a previous target level, and transfers the specific target level toward the wireless power transmission apparatus 100 to sequentially increase the target level, thereby improving stability of the wireless power system 10. For example, when power transmitted from the wireless power transmission apparatus 100 is lower than power required for an operation of the load 240, the reception side controller 250 can transmit data requesting an increase in the target level to the wireless power transmission apparatus 100 through the reception side communication unit, and when power transmitted from the wireless power transmission apparatus 100 is higher than power required for an operation of the load 240, the reception side controller 250 can transmit data requesting a decrease in the target level to the wireless power transmission apparatus 100 through the reception side communication unit.

In some implementations, when data requesting an increase or decrease in the target level are received, the wireless power transmission apparatus 100 can change the target level to be less than a predetermined level from a current target level to sequentially increase the target level, thereby improving stability of the wireless power system 10.

When the voltage applied to the dc terminal capacitor 230 exceeds a predetermined voltage value, the reception side controller 250 can determine that an overvoltage is applied. For example, the predetermined voltage value, which is a criterion for determining application of the overvoltage, can be determined according to specifications of components included in the wireless power reception apparatus 200.

When it is determined that the overvoltage is applied, the reception side controller 250 can transmit data regarding an overvoltage to the wireless power transmission apparatus 100 through the reception side communication unit. For example, when the load 240 rapidly changes to a light load state or no load state while operating in a full load state, a current flowing to the load 240 can be rapidly reduced, and an overvoltage exceeding a predetermined voltage value can be applied to the dc terminal capacitor 230.

In some implementations, the reception side controller 250 can transmit data regarding an overvoltage to the wireless power transmission apparatus 100 based on a voltage applied to the dc terminal capacitor 230.

The wireless power reception apparatus 200 can further include an input unit. The input unit can include various switches for manipulating an operation control of the wireless power reception apparatus 200. For example, the input unit can include an operation switch for selecting on/off or an operation mode of the wireless power reception apparatus 200.

The reception side controller 250 can determine an operation mode of the wireless power reception apparatus 200 according to a user input received through the input unit and determine power required for an operation of the load 240 according to the operation mode of the wireless power reception apparatus 200.

Figure 5:
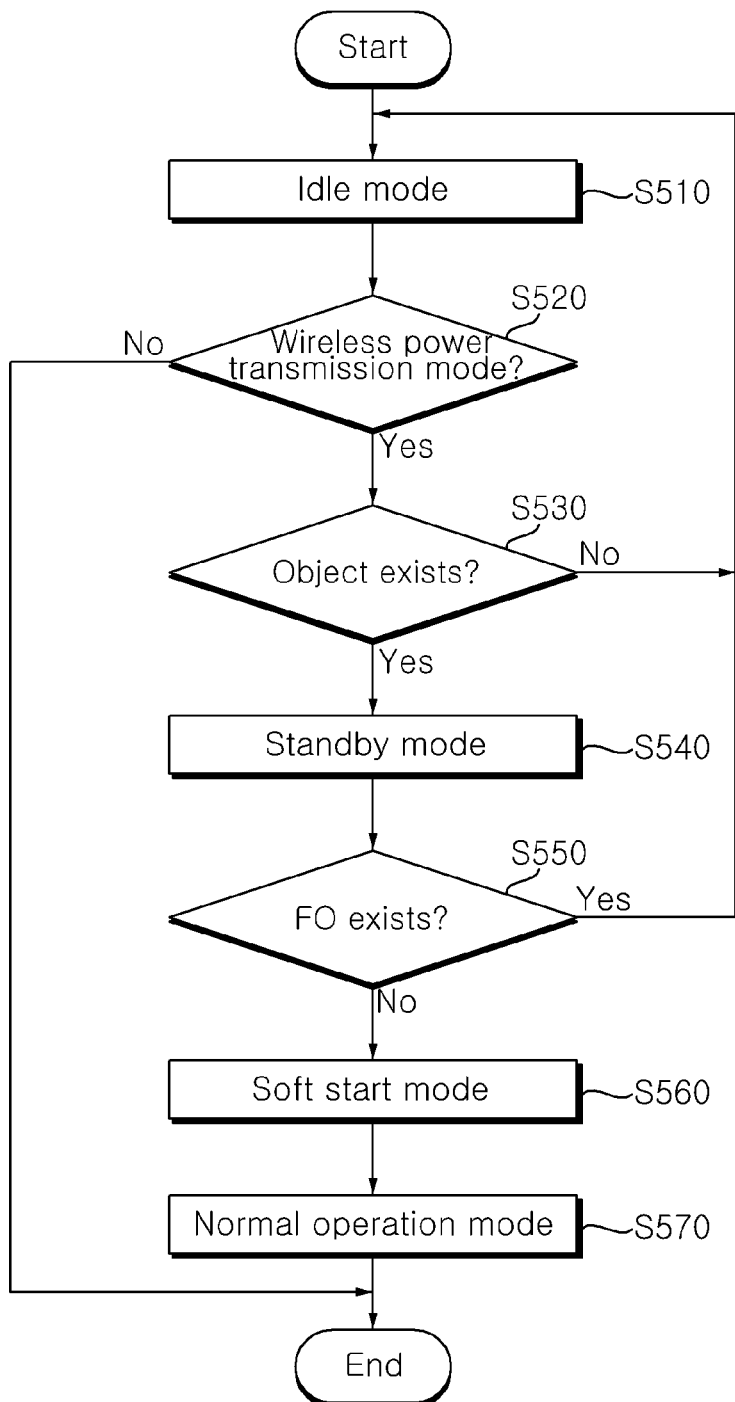
FIG. 5 is a flowchart illustrating an exemplary process for power transmission of a wireless power transmission apparatus.
Figure 6:
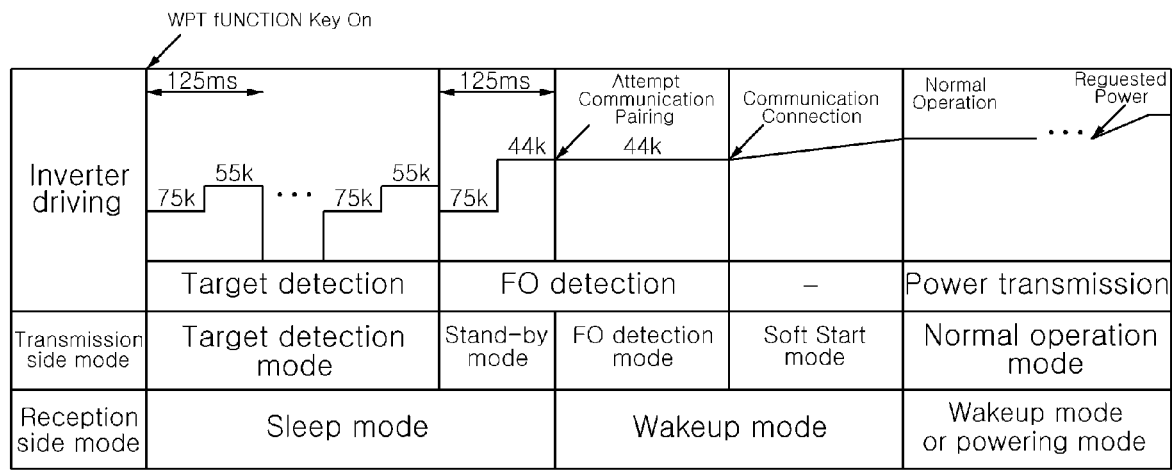
FIG. 6 is a diagram illustrating states of a wireless power transmission apparatus and a wireless power reception apparatus according to the flowchart of FIG. 5.

FIG. 5 is a flowchart for an exemplary process for power transmission of a wireless power transmission apparatus, and FIG. 6 is a diagram illustrating a state of a wireless power transmission apparatus and a wireless power reception apparatus according to the flowchart of FIG. 5.

Referring to FIGS. 5 and 6, the wireless power transmission apparatus 100 can enter an idle mode in operation S510.

For example, the idle mode can refer to a mode in which power is applied to each component included in the wireless power transmission apparatus 100 and the controller 180 is awakened when power of the wireless power transmission apparatus 100 is turned on.

The wireless power transmission apparatus 100 can determine whether an operation mode thereof is a wireless power transmission mode in operation S520. For example, the wireless power transmission apparatus 100 can determine an operation mode thereof according to a user input received through an input unit provided therein.

In some implementations, if an operation mode of the wireless power transmission apparatus 100 is not a wireless power transmission mode, for example, an induction heating mode, the wireless power transmission apparatus 100 can perform an operation corresponding to the induction heating mode.

If an operation mode of the wireless power transmission apparatus 100 is a wireless power transmission mode, the wireless power transmission apparatus 100 can detect whether an object exists adjacent to the transmission coil 150 in operation S530. For example, the wireless power transmission apparatus 100 can control the switching elements S1 and S2 included in the inverter 140 to perform a switching operation according to a first switching frequency (e.g., 75 kHz) so that a predetermined current flows through the transmission coil 150.

In some implementations, the wireless power transmission apparatus 100 can determine whether an object exists adjacent to the transmission coil 150 and/or a type of the object. For example, the wireless power transmission apparatus 100 can determine whether an object does not exist, whether the object is adjacent to the transmission coil 150 and is the wireless power reception apparatus 200 including the reception coil 210, whether the object is a small cooking appliance without the reception coil 210 for receiving power, whether the object is a general cooking tool such as a pot, or whether the object is a foreign object based on a current flowing through the transmission coil 150 and a voltage applied to the transmission coil 150. Further, for example, the wireless power transmission apparatus 100 can determine an alignment state of the object with respect to the transmission coil 150.

If the object is adjacent to the transmission coil 150 and is the wireless power reception apparatus 200, the wireless power transmission apparatus 100 can enter a standby mode in operation S540.

For example, the stand-by mode can refer to a mode that changes a switching frequency for a switching operation of the switching elements S1 and S2 of the inverter 140 from a first switching frequency (e.g., 75 kHz) for detecting an object to a second switching frequency (e.g., 44 kHz) before determining whether a foreign object (FO) exists adjacent to the transmission coil 150. By way of further example, in the standby mode, the wireless power transmission apparatus 100 can control a switching frequency for a switching operation of the switching elements S1 and S2 to frequency sweep from a first switching frequency (e.g., 75 kHz) to a second switching frequency (e.g., 44 kHz).

The reason for performing the stand-by mode between the object detection operation and the foreign object detection operation is that driving noise may occur when the switching elements S1 and S2 switch according to the second switching frequency (e.g., 44 kHz) lower than the first switching frequency (e.g., 75 kHz) in a state in which a voltage of the dc link terminal of the wireless power transmission apparatus 100 is charged.

In operation S550, the wireless power transmission apparatus 100 can perform a foreign object detection (FOD) operation of determining whether an FO exists. For example, the wireless power transmission apparatus 100 can control the switching elements S1 and S2 to switch according to the second switching frequency (e.g., 44 kHz) so that an AC current flows through the transmission coil 150. In some implementations, the second switching frequency (e.g., 44 kHz) can be a switching frequency when power capable of awakening the wireless power reception apparatus 200 is transmitted from the transmission coil 150.

In some implementations, an induced current can flow through the reception coil 210 of the wireless power reception apparatus 200, and power can be supplied to each component of the wireless power reception apparatus 200 and each component of the wireless power reception apparatus 200 can be awakened. For example, a mode of the wireless power reception apparatus 200 can refer to a wakeup mode, and a mode prior to the wakeup mode can refer to a sleep mode.

Further, the wireless power transmission apparatus 100 can perform communication pairing with the awakened wireless power reception apparatus 200 and transmit and receive data to and from each other. For example, the wireless power transmission apparatus 100 can receive data regarding a voltage induced in the wireless power reception apparatus 200 from the wireless power reception apparatus 200, and determine whether an FO exists based on the received data.

If the object is not the wireless power reception apparatus 200 in operation S530 or if there is an FO in operation S550, the wireless power transmission apparatus 100 can enter an idle mode in operation S510.

In some implementations, if the object is not the wireless power reception apparatus 200 in operation S530 or if there is an FO in operation S550, the wireless power transmission apparatus 100 can output a message about the object or foreign material through the output unit thereof.

If there is no FO, the wireless power transmission apparatus 100 can enter a soft start mode in operation S560.

In some implementations, the soft start mode can refer to a mode in which an output level, which is a level of power transmitted through the transmission coil 150, increases to a power level (e.g., target level) for a normal operation of the wireless power reception apparatus 200. For example, the wireless power transmission apparatus 100 can increase the output level to a preset power level. By way of further example, the wireless power transmission apparatus 100 can receive data regarding a power level from the wireless power reception apparatus 200 and increase the output level according to the received target level.

In some implementations, the wireless power transmission apparatus 100 can decrease the switching frequency of the switching elements S1 and S2 of the inverter 140 so that the output level increases to the power level.

When the output level increases to a power level for a normal operation of the wireless power reception apparatus 200, the wireless power transmission apparatus 100 can enter a normal operation mode in operation S570.

For example, the normal operation mode can refer to a mode in which the wireless power transmission apparatus 100 compares an output level and a target level and adjusts the output level according to the comparison result.

The wireless power transmission apparatus 100 can monitor a change in a target level in a normal operation mode.

The wireless power transmission apparatus 100 can receive data regarding a target level from the wireless power reception apparatus 200, and monitor a change in the target level based on the received data on the target level. For example, when data designating a specific target level required for an operation of the load 240 are received from the wireless power reception apparatus 200, the wireless power transmission apparatus 100 can check a difference between a current target level and a specific target level to maintain, increase, or decrease the current target level. For example, when data requesting an increase in a target level or data requesting a decrease in a target level are received from the wireless power reception apparatus 200, the wireless power transmission apparatus 100 can maintain, increase, or decrease the current target level according to the received data.

The wireless power transmission apparatus 100 can adjust the output level according to the target level in a normal operation mode. For example, when the output level is lower than the target level, the wireless power transmission apparatus 100 can reduce the switching frequency of the switching elements S1 and S2 of the inverter 140 so that the output level increases to the target level. For example, when the output level is higher than the target level, the wireless power transmission apparatus 100 can increase the switching frequency of the switching elements S1 and S2 of the inverter 140 so that the output level decreases to the target level. For example, when the output level corresponds to the target level, the wireless power transmission apparatus 100 can maintain the switching frequency of the switching elements S1 and S2 of the inverter 140 so that the output level is maintained.

Further, when a current target level is changed, the wireless power transmission apparatus 100 can adjust an output level according to the changed target level.

The wireless power transmission apparatus 100 can determine a load state of the wireless power reception apparatus 200 in a normal operation mode, and control an operation of the inverter 140 according to the load state of the wireless power reception apparatus 200. In this regard, the present disclosure will be described in detail with reference to FIGS. 7A and 7B.

Figure 7A:
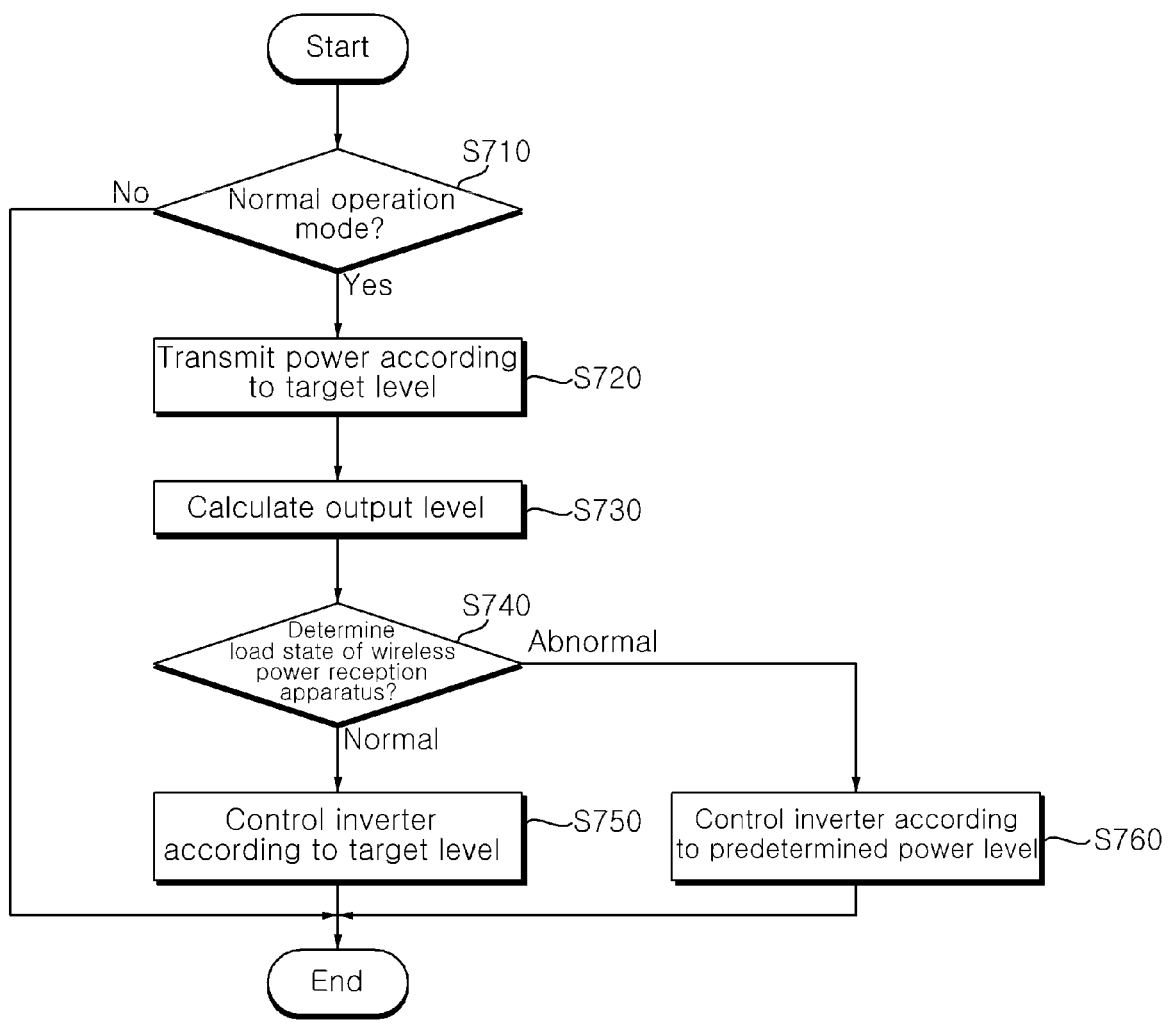
FIGS. 7A and 7B are flowcharts illustrating a method of operating a wireless power transmission apparatus.
Figure 7B:
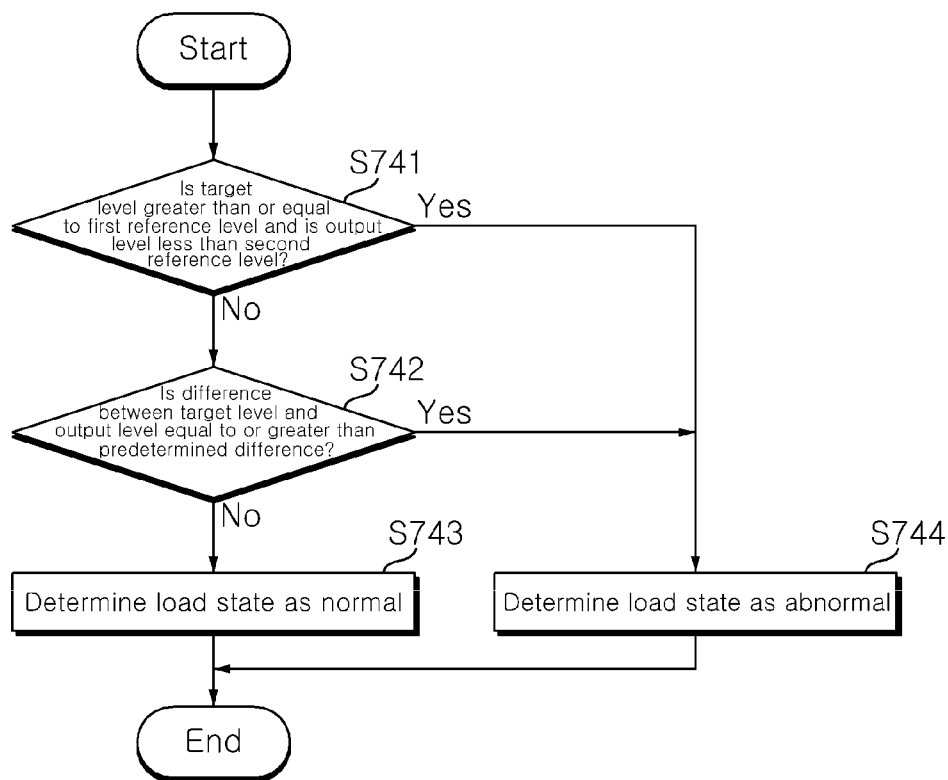

FIGS. 7A and 7B are flowcharts illustrating a method of operating a wireless power transmission apparatus, and FIGS. 8A, 8B, 9, and 10 are diagrams illustrating a method of operating a wireless power transmission apparatus.

Referring to FIG. 7A, in operation S710, the wireless power transmission apparatus 100 can determine whether it is operating in a normal operation mode. For example, the wireless power transmission apparatus 100 can determine whether an output level thereof is being adjusted according to the target level after the output level increases to the power level for a normal operation of the wireless power reception apparatus 200.

If the wireless power transmission apparatus 100 is not operating in the normal operation mode, the wireless power transmission apparatus 100 can perform an operation corresponding to a mode in which the wireless power transmission apparatus 100 has entered.

The wireless power transmission apparatus 100 can transmit power to the wireless power reception apparatus 200 according to the target level in operation S720.

When data designating a specific target level required for an operation of the load 240 are received from the wireless power reception apparatus 200, the wireless power transmission apparatus 100 can check a difference between a current target level and a specific target level to maintain, increase, or decrease the current target level. For example, when receiving data designating a specific target level from the wireless power reception apparatus 200, the controller 180 can change the target level to the specific target level.

In some implementations, the wireless power transmission apparatus 100 can change the switching frequency of the switching elements S1 and S2 of the inverter 140 so that the output level reaches the target level. For example, when the output level is lower than the target level, the wireless power transmission apparatus 100 can reduce the switching frequency of the switching elements S1 and S2 of the inverter 140 so that the output level increases to the target level. For example, when the output level is higher than the target level, the wireless power transmission apparatus 100 can increase the switching frequency of the switching elements S1 and S2 of the inverter 140 so that the output level decreases to the target level. For example, when the output level corresponds to the target level, the wireless power transmission apparatus 100 can maintain the switching frequency of the switching elements S1 and S2 of the inverter 140 so that the output level is maintained.

The wireless power transmission apparatus 100 can calculate an output level, which is a level of power transmitted through the transmission coil 150 in operation S730. For example, the wireless power transmission apparatus 100 can calculate an output level based on (i) a current output from the inverter 140 and flowing through the transmission coil 150 and (ii) a voltage applied to the output terminal of the inverter 140.

Referring to FIG. 7A, it is illustrated that the wireless power transmission apparatus 100 calculates the output level in operation S730. However, when the wireless power transmission apparatus 100 is operating in a normal operation mode, the wireless power transmission apparatus 100 can continue to calculate the output level to monitor power transmitted through the transmission coil 150.

When the load 240 of the wireless power reception apparatus 200 suddenly changes to a light load state or no load state while operating in a full load state in the normal operation mode, an overvoltage may be applied to components included in the wireless power reception apparatus 200.

Figure 8A:
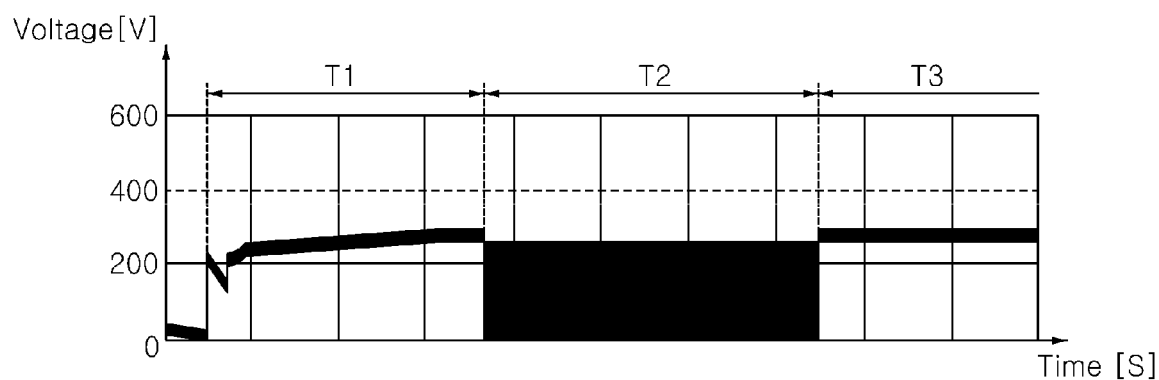
FIGS. 8A, 8B, 9, and 10 are diagrams illustrating a method of operating a wireless power transmission apparatus.
Figure 8B:
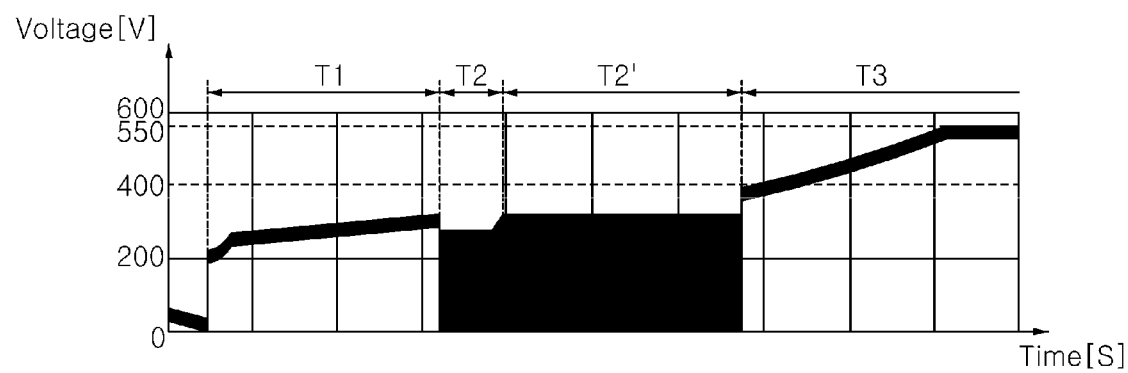

FIGS. 8A and 8B are graphs of voltages applied to the dc terminal capacitor 230 of the wireless power reception apparatus 200 as the wireless power transmission apparatus 100 transmits power.

Referring to FIGS. 8A and 8B, a period T1 is a period in which the wireless power transmission apparatus 100 transmits power that awakens the wireless power reception apparatus 200, a period T2 is a period in which the load 240 of the wireless power reception apparatus 200 operates in a full load state while the wireless power transmission apparatus 100 transmits power that awakens the wireless power reception apparatus 200, a period T2' is a period in which the load 240 of the wireless power reception apparatus 200 operates in a full load state while the wireless power transmission apparatus 100 transmits power according to the target level, and a period T3 is a period in which the load 240 of the wireless power reception apparatus 200 is changed to a light load state or no load state.

In some implementations, a predetermined voltage value, which is a criterion for determining the overvoltage application, can be set to 400V. In some implementations, the predetermined voltage value can be set according to specifications of components included in the wireless power reception apparatus 200.

Referring to FIG. 8A, in periods T1 to T3, while the wireless power transmission apparatus 100 transmits power (e.g., 500 W) that awakens the wireless power reception apparatus 200, a voltage of less than a predetermined voltage value (e.g., 400V) is applied to the dc terminal capacitor 230 of the wireless power reception apparatus 200 regardless of a load state of the wireless power reception apparatus 200.

More specifically, while the wireless power transmission apparatus 100 transmits power that awakens the wireless power reception apparatus 200, in the period T2 in which the load 240 of the wireless power reception apparatus 200 operates in a full load state, a voltage value applied to the dc terminal capacitor 230 of the wireless power reception apparatus 200 can be 172V, and a peak value can be 269V.

Further, while the wireless power transmission apparatus 100 transmits power that awakens the wireless power reception apparatus 200, even in the period T3 in which the load 240 of the wireless power reception apparatus 200 is changed to a light load state or no load state, a voltage value applied to the dc terminal capacitor 230 of the wireless power reception apparatus 200 can be 275V.

Referring to FIG. 8B, while the wireless power transmission apparatus 100 transmits power according to a target level (e.g., 2 kW), in a period T2' in which the load 240 of the wireless power reception apparatus 200 operates in a full load state, a voltage (e.g., 212V) that is less than a predetermined voltage value (e.g., 400V) is applied to the dc terminal capacitor 230 of the wireless power reception apparatus 200, and a peak value is 326V.

However, while the wireless power transmission apparatus 100 transmits power according to a target level (e.g., 2 kW), in the period T3 in which the load 240 of the wireless power reception apparatus 200 is changed to a light load state or no load state, the voltage applied to the dc terminal capacitor 230 of the wireless power reception apparatus 200 increases and thus a voltage (e.g., 548V) exceeding a predetermined voltage value (e.g., 400V) is applied.

In this way, while the wireless power transmission apparatus 100 transmits power according to the target level, when the load 240 of the wireless power reception apparatus 200 rapidly changes to a light load state or no load state, an overvoltage exceeding a predetermined voltage value may be applied to the dc terminal capacitor 230 of the wireless power reception apparatus 200, and thus components included in the wireless power reception apparatus 200 may be damaged.

Further, when the load 240 of the wireless power reception apparatus 200 rapidly changes to a light load state or no load state while operating in a full load state in the normal operation mode, the efficiency of power transmission and reception between the wireless power transmission apparatus 100 and the wireless power reception apparatus 200 may be drastically lowered, and the output level of power transmitted from the wireless power transmission apparatus 100 may be significantly lowered compared to the target level.

Referring again to FIG. 7A, in operation S740, the wireless power transmission apparatus 100 can determine a load state of the wireless power reception apparatus 200 based on the output level and the target level.

Referring to FIG. 7B, in operation S741, the wireless power transmission apparatus 100 can determine whether a target level is greater than or equal to a preset first reference level and an output level is less than a second reference level.

The setting of the first reference level and the second reference level will be described with reference to FIG. 9.

Figure 9:
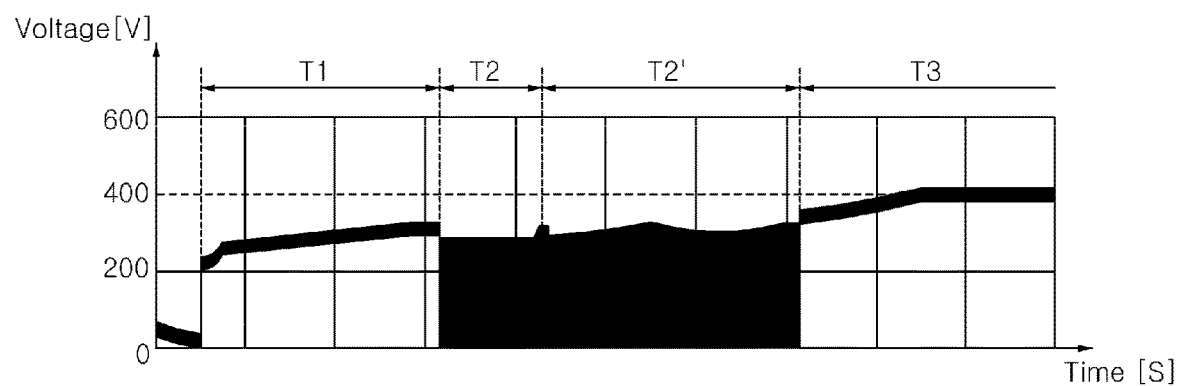

FIG. 9 is a graph of a voltage applied to the dc terminal capacitor 230 of the wireless power reception apparatus 200.

For example, FIG. 9 is a graph of a voltage applied to the dc terminal capacitor 230 of the wireless power reception apparatus 200 when the target level in the period T2' and the period T3 is set to 1 kW.

Referring to FIG. 9, when the target level is 1 kW, in the period T2' in which the load 240 of the wireless power reception apparatus 200 operates in a full load state, a predetermined voltage value (e.g., a voltage less than 400V) can be applied to the dc terminal capacitor 230 of the wireless power reception apparatus 200.

In the period T3 in which the load 240 of the wireless power reception apparatus 200 is changed to a light load state or no load state, a voltage (e.g., 399V) close to a predetermined voltage value (e.g., 400V) can be applied to the dc terminal capacitor 230 of the wireless power reception apparatus 200.

For example, as illustrated in FIG. 9, even if the load 240 of the wireless power reception apparatus 200 is changed to a light load state or no load state, when the wireless power transmission apparatus 100 transmits power according to a target level less than a predetermined level, an overvoltage may not be applied to the dc terminal capacitor 230 of the wireless power reception apparatus 200.

Thereby, the first reference level, which is a criterion for determining the load state of the wireless power reception apparatus 200 can be a maximum target level (e.g., 1 kW) in which an overvoltage is not applied to the dc terminal capacitor 230 of the wireless power reception apparatus 200, even if the load 240 of the wireless power reception apparatus 200 is changed to a light load state or no load state.

The second reference level, which is another criterion for determining the load state of the wireless power reception apparatus 200, can be a minimum target level in which power can be applied to each component of the wireless power reception apparatus 200. For example, the second reference level can correspond to a power level (e.g., 500 W) that awakens the wireless power reception apparatus 200.

Alternatively, the second reference level can be a maximum level of an output level calculated in the wireless power transmission apparatus 100 when the load state of the wireless power reception apparatus 200 is a light load state or no load state.

In operation S742, if the target level is higher than the output level and a difference between the target level and the output level is equal to or greater than a predetermined difference (e.g., 500 W), the wireless power transmission apparatus 100 can determine the load state of the wireless power reception apparatus 200 as abnormal.

For example, a predetermined difference (e.g., 500 W), which is a criterion for determining the load state of the wireless power reception apparatus 200, can be a power value in which the load 240 of the wireless power reception apparatus 200 is greater than a maximum difference (e.g., 200 W) that can occur between the target level and the output level.

If the difference between the target level and the output level is less than a predetermined difference, the wireless power transmission apparatus 100 can determine the load state of the wireless power reception apparatus 200 as normal in operation S743.

If the target level is greater than or equal to a preset first reference level and the output level is less than a second reference level or if a difference between the target level and the output level is greater than or equal to a predetermined difference, the wireless power transmission apparatus 100 can determine the load state of the wireless power reception apparatus 200 as abnormal in operation S744.

The wireless power transmission apparatus 100 can omit any one of the operation S741 and the operation S742 in determining the load state of the wireless power reception apparatus 200.

Referring again to FIG. 7A, if the load state of the wireless power reception apparatus 200 is normal, the wireless power transmission apparatus 100 can control an operation of the inverter 140 according to the target level in operation S750. For example, when the load state of the wireless power reception apparatus 200 is normal, the wireless power transmission apparatus 100 can control an operation of the inverter 140 so that the output level reaches a target level.

If the load state of the wireless power reception apparatus 200 is abnormal, the wireless power transmission apparatus 100 can control an operation of the inverter 140 according to a predetermined power level lower than the target level in operation S760.

For example, the predetermined power level can be equal to or greater than a minimum target level in which power can be applied to each component of the wireless power reception apparatus 200, and the predetermined power level can be less than a maximum target level in which an overvoltage is not applied to the dc terminal capacitor 230 of the wireless power reception apparatus 200. For example, the predetermined power level can be a power level (e.g., 600 W) equal to or greater than a power level (e.g., 500 W) that awakens the wireless power reception apparatus 200 and less than a maximum target level (e.g., 1 kW) in which an overvoltage is not applied to the dc terminal capacitor 230 of the wireless power reception apparatus 200. For example, when the load state of the wireless power reception apparatus 200 is abnormal, the controller 180 can control an operation of the inverter 140 so that the output level is maintained corresponding to a predetermined power level.

Figure 10:
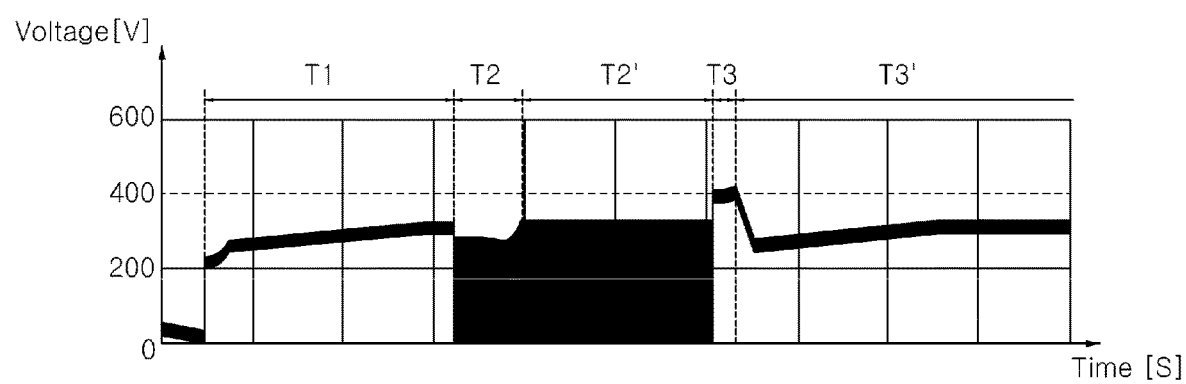

Referring to FIG. 10, in the period T3 in which the load 240 of the wireless power reception apparatus 200 is changed to a light load state or no load state, the wireless power transmission apparatus 100 can determine the load state of the wireless power reception apparatus 200 as abnormal, and change the output level so that the output level corresponds to the predetermined power level (e.g., 600 W).

In some implementations, when the load 240 of the wireless power reception apparatus 200 is a light load state or no load state, in a period T3' in which the output level of the wireless power transmission apparatus 100 is maintained corresponding to the predetermined power level (e.g., 600 W), a voltage (e.g., 305V) less than a predetermined voltage value (e.g., 400V) can be applied to the dc terminal capacitor 230 of the wireless power reception apparatus 200.

Figure 11:
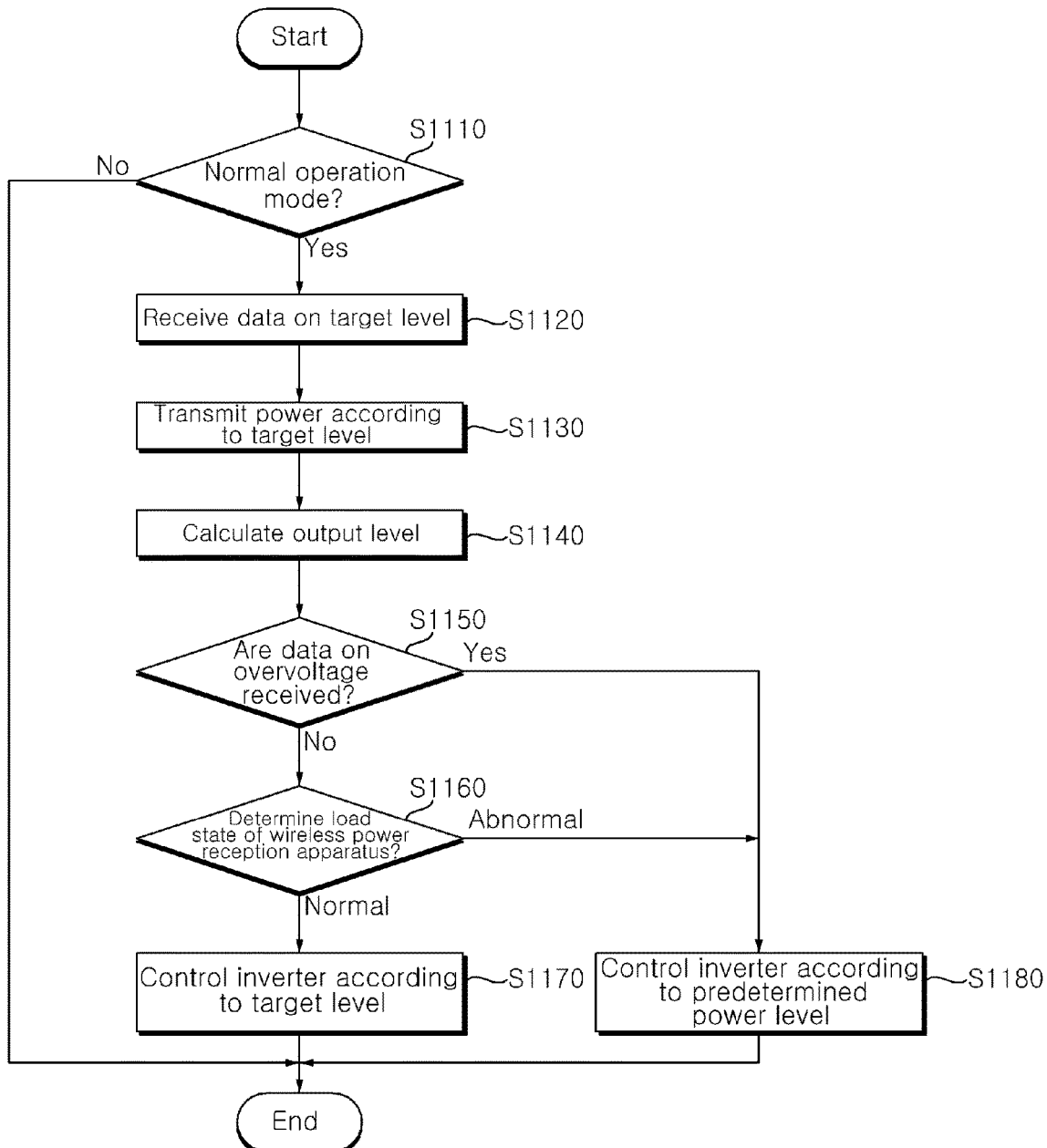
FIG. 11 is a flowchart illustrating an exemplary method of operating a wireless power transmission apparatus.

FIG. 11 is a flowchart illustrating an exemplary method of operating a wireless power transmission apparatus. Detailed descriptions of contents overlapping with those described with reference to FIG. 7 will be omitted.

Referring to FIG. 11, in operation S1110, the wireless power transmission apparatus 100 can determine whether it is operating in a normal operation mode.

If the wireless power transmission apparatus 100 is not operating in the normal operation mode, the wireless power transmission apparatus 100 can perform an operation corresponding to a mode in which the wireless power transmission apparatus 100 has entered.

The wireless power transmission apparatus 100 can receive data on a target level from the wireless power reception apparatus 200 in operation S1120. For example, the wireless power transmission apparatus 100 can receive data designating a specific target level from the wireless power reception apparatus 200. For example, the wireless power transmission apparatus 100 can receive data requesting an increase, decrease, or maintenance of the target level.

The wireless power transmission apparatus 100 can transmit power to the wireless power reception apparatus 200 based on data regarding the target level received from the wireless power reception apparatus 200 in operation S1130.

The wireless power transmission apparatus 100 can calculate an output level, which is a level of power transmitted through the transmission coil 150 in operation S1140.

Referring to FIG. 11, it is illustrated that the wireless power transmission apparatus 100 calculates the output level in operation S1140. However, when the wireless power transmission apparatus 100 is operating in a normal operation mode, the wireless power transmission apparatus 100 can continue to calculate the output level to monitor power transmitted through the transmission coil 150.

The wireless power transmission apparatus 100 can determine whether data regarding an overvoltage are received from the wireless power reception apparatus 200 in operation S1150. For example, when an overvoltage exceeding a predetermined voltage value (e.g., 400V) is applied to the dc terminal capacitor 230 of the wireless power reception apparatus 200, the wireless power reception apparatus 200 can transmit data regarding an overvoltage to the wireless power transmission apparatus 100. In some implementations, when data regarding an overvoltage are received from the wireless power reception apparatus 200, the wireless power transmission apparatus 100 can determine that an overvoltage exceeding a predetermined voltage value (e.g., 400V) is applied to the dc terminal capacitor 230 of the wireless power reception apparatus 200. For example, the wireless power transmission apparatus 100 can receive data regarding a voltage applied to the dc terminal capacitor 230 from the wireless power reception apparatus 200. In some implementations, if an overvoltage exceeding a predetermined voltage value (e.g., 400V) is applied to the dc terminal capacitor 230 of the wireless power reception apparatus 200, the wireless power transmission apparatus 100 can determine that data regarding an overvoltage are received.

If data regarding an overvoltage are not received from the wireless power reception apparatus 200, the wireless power transmission apparatus 100 can determine a load state of the wireless power reception apparatus 200 based on the output level and the target level in operation S1160.

If the target level is higher than the output level and a difference between the target level and the output level is greater than or equal to a predetermined difference (e.g., 500 W), the wireless power transmission apparatus 100 can determine the load state of the wireless power reception apparatus 200 as abnormal.

If the target level is greater than or equal to a preset first reference level (e.g., 1 kW) and the output level is less than a second reference level (e.g., 500 W), the wireless power transmission apparatus 100 can determine the load state of the wireless power reception apparatus 200 as abnormal.

If the load state of the wireless power reception apparatus 200 is normal, the wireless power transmission apparatus 100 can control an operation of the inverter 140 according to the target level in operation S1170.

If data regarding an overvoltage are received from the wireless power reception apparatus 200 or if a load state of the wireless power reception apparatus 200 is abnormal, the wireless power transmission apparatus 100 can control an operation of the inverter 140 according to a predetermined power level lower than the target level in operation S1180.

As described above, in some implementations, because it is possible to determine a load state of the wireless power reception apparatus 200 based on the output level of power transmitted from the wireless power transmission apparatus 100, even when the load state of the wireless power reception apparatus 200 changes rapidly to a light load state or no load state, it is possible to respond more quickly to a change in the load state of the wireless power reception apparatus 200.

Further, in some implementations, it is possible to more accurately determine a load state of the wireless power reception apparatus 200 by using data regarding a voltage and data regarding an overvoltage received from the wireless power reception apparatus.

Further, in some implementations, by adjusting a level of power transmitted to the wireless power reception apparatus 200 according to the load state of the wireless power reception apparatus 200, an overvoltage can be limited from being applied to the wireless power reception apparatus 200, and elements provided in the wireless power reception apparatus 200 can be prevented from being damaged due to overvoltage application.

Moreover, in some implementations, when a load state of the wireless power reception apparatus 200 is abnormal, even before receiving data regarding an overvoltage from the wireless power reception apparatus 200, a warning message can be more quickly and accurately output to a user, thereby improving the user's product reliability and use satisfaction.

What is claimed is:

1. A wireless power transmission apparatus, comprising:
a transmission coil configured to transmit power to a wireless power reception apparatus;
an inverter that includes a plurality of switching elements and that is configured to output a current of a predetermined frequency to the transmission coil through an operation of the plurality of switching elements; and
a controller configured to:
calculate an output level of power transmitted through the transmission coil based on the current flowing through the transmission coil,
determine a load state of the wireless power reception apparatus based on a target level of power transmitted through the transmission coil and the calculated output level,
when the load state of the wireless power reception apparatus changes to a light-load or a no-load state while operating in a full-load state, determine that the load state of the wireless power reception apparatus is abnormal, and
control the inverter based on the determined load state of the wireless power reception apparatus.

2. The wireless power transmission apparatus of claim 1, wherein the controller is configured to:
based on the load state of the wireless power reception apparatus being normal, control the inverter according to the target level, and
based on the load state of the wireless power reception apparatus being abnormal, control the inverter according to a predetermined power level that is lower than the target level.

3. The wireless power transmission apparatus of claim 2, wherein the controller is configured to:
based on the load state of the wireless power reception apparatus being normal, control the inverter to adjust the output level to reach the target level, and
based on the load state of the wireless power reception apparatus being abnormal, control the inverter to maintain the output level according to the predetermined power level.

4. The wireless power transmission apparatus of claim 1, wherein the controller is configured to:
based on the target level being greater than or equal to a first reference level and the output level being less than a second reference level that is lower than the first reference level, determine that the load state of the wireless power reception apparatus changes to the light-load or the no-load state while operating in the full-load state.

5. The wireless power transmission apparatus of claim 1, wherein the controller is configured to:
based on a difference between the target level and the output level being greater than or equal to a predetermined difference, determine that the load state of the wireless power reception apparatus changes to the light-load or the no-load state while operating in the full-load state.

6. The wireless power transmission apparatus of claim 1, further comprising a communication unit configured to communicate with the wireless power reception apparatus, wherein the controller is configured to:
receive, from the wireless power reception apparatus, data regarding the target level through the communication unit, and
determine a new target level based on the received data regarding the target level.

7. The wireless power transmission apparatus of claim 6, wherein the controller is configured to:
receive, from the wireless power reception apparatus, data regarding an overvoltage, and
determine a load state of the wireless power reception apparatus based on the received data regarding the overvoltage.

8. The wireless power transmission apparatus of claim 7, wherein the controller is configured to:
based on the data regarding the overvoltage being received from the wireless power reception apparatus, determine the load state of the wireless power reception apparatus as abnormal, and
based on the data regarding the overvoltage not being received from the wireless power reception apparatus, determine the load state of the wireless power reception apparatus based on the target level and the output level.

9. The wireless power transmission apparatus of claim 1, further comprising:
a current detector configured to detect the current output from the inverter; and
a voltage detector configured to detect a voltage applied to an output terminal of the inverter,
wherein the controller is configured to calculate the output level based on a current value detected through the current detector and a voltage value detected through the voltage detector.

10. The wireless power transmission apparatus of claim 1, further comprising an output unit,
wherein the controller is configured to output a warning message through the output unit based on the load state of the wireless power reception apparatus being abnormal.

11. A method of operating a wireless power transmission apparatus, the method comprising:
calculating an output level of power transmitted to a wireless power reception apparatus through a transmission coil included in the wireless power transmission apparatus, based on a current flowing through the transmission coil;
determining a load state of the wireless power reception apparatus based on a target level of power transmitted through the transmission coil and the calculated output level;
when the load state of the wireless power reception apparatus changes to a light-load or a no-load state while operating in a full-load state, determining that the load state of the wireless power reception apparatus is abnormal; and
controlling an inverter included in the wireless power transmission apparatus based on the determined load state of the wireless power reception apparatus.

12. The method of claim 11, wherein controlling an inverter comprises:
based on the load state of the wireless power reception apparatus being normal, controlling the inverter according to the target level; and based on the load state of the wireless power reception apparatus being abnormal, controlling the inverter according to a predetermined power level that is lower than the target level.

13. The method of claim 12, wherein controlling the inverter according to the target level comprises controlling the inverter to adjust the output level to reach the target level, and wherein controlling the inverter according to a predetermined power level comprises controlling the inverter to maintain the output level according to the predetermined power level.

14. The method of claim 13, wherein determining the load state of the wireless power reception apparatus comprises:

based on the target level being greater than or equal to a first reference level and the output level being less than a second reference level that is lower than the first reference level, determining that the load state of the wireless power reception apparatus changes to the light-load or the no-load state while operating in the full-load state.

15. The method of claim 11, wherein determining the load state of the wireless power reception apparatus further comprises:

based on a difference between the target level and the output level being greater than or equal to a predetermined difference, determining that the load state of the wireless power reception apparatus changes to the light-load or the no-load state while operating in the full-load state.

16. The method of claim 14, further comprising:
receiving, from the wireless power reception apparatus, data regarding the target level through a communication unit included in the wireless power transmission apparatus; and
determining a new target level based on the received data regarding the target level.

17. The method of claim 16, further comprising:
receiving, from the wireless power reception apparatus, data regarding overvoltage through the communication unit; and
initially determining a load state of the wireless power reception apparatus based on the received data regarding the overvoltage.

18. The method of claim 17, wherein initially determining a load state comprises:

based on the data regarding the overvoltage being received from the wireless power reception apparatus, determining the load state of the wireless power reception apparatus as abnormal; and based on the data regarding the overvoltage not being received from the wireless power reception apparatus, determining the load state of the wireless power reception apparatus based on the target level and the output level.

19. The method of claim 11, wherein calculating an output level comprises:

detecting the current output from the inverter;
detecting a voltage applied to an output terminal of the inverter; and
calculating the output level based on the detected current output and the detected voltage.

20. The method of claim 11, further comprising outputting a warning message through an output unit included in the wireless power transmission apparatus based on the load state of the wireless power reception apparatus being abnormal.

* * * * *